US011689732B2

(12) United States Patent
Jang et al.

(10) Patent No.: US 11,689,732 B2
(45) Date of Patent: Jun. 27, 2023

(54) IMAGE ENCODING/DECODING METHOD AND DEVICE USING PALETTE MODE, AND METHOD FOR TRANSMITTING BITSTREAM

(71) Applicant: LG ELECTRONICS INC., Seoul (KR)

(72) Inventors: Hyeong Moon Jang, Seoul (KR); Sunmi Yoo Yoo, Seoul (KR); Jung Hak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/697,474

(22) Filed: Mar. 17, 2022

(65) Prior Publication Data

US 2022/0210449 A1    Jun. 30, 2022

Related U.S. Application Data

(63) Continuation of application No. PCT/KR2020/012898, filed on Sep. 23, 2020.

(Continued)

(51) Int. Cl.
*H04N 19/186* (2014.01)
*H04N 19/119* (2014.01)
(Continued)

(52) U.S. Cl.
CPC ......... *H04N 19/186* (2014.11); *H04N 19/119* (2014.11); *H04N 19/159* (2014.11); *H04N 19/176* (2014.11); *H04N 19/96* (2014.11)

(58) Field of Classification Search
None
See application file for complete search history.

(56) References Cited

U.S. PATENT DOCUMENTS

2019/0246122 A1* 8/2019 Zhang .................... H04N 19/91
2021/0051336 A1* 2/2021 Chao .................. H04N 19/1883
(Continued)

FOREIGN PATENT DOCUMENTS

KR    20160123287 A    10/2016
KR    20170016958 A    2/2017
(Continued)

OTHER PUBLICATIONS

Jing YE, et al., "CE15-related: palette mode when dual-tree is enabled", Joint Video Experts Team (JVET) of ITU-T SG 16 WP 3 and ISO/IEC JTC 1/SC 29/WG 11, 12th Meeting: Macao, CN, Oct. 3-12, 2018. JVET-L0308.

*Primary Examiner* — Kaitlin A Retallick
(74) *Attorney, Agent, or Firm* — Dentons US LLP

(57) ABSTRACT

An image encoding/decoding method and apparatus are provided. An image decoding method performed by an image decoding apparatus may comprise obtaining palette information and palette index prediction information of a current block from a bitstream, based on a palette mode applying for the current block, constructing a palette predictor for the current block based on the palette information and constructing a palette table for the current block based on the palette predictor, generating a palette index map for the current block based on the palette index prediction information, and decoding the current block based on the palette table and the palette index map, The palette predictor may be selectively updated based on a split structure of the current block.

13 Claims, 29 Drawing Sheets

Related U.S. Application Data

(60) Provisional application No. 62/904,578, filed on Sep. 23, 2019.

(51) Int. Cl.
  *H04N 19/159* (2014.01)
  *H04N 19/176* (2014.01)
  *H04N 19/96* (2014.01)

(56) References Cited

U.S. PATENT DOCUMENTS

| | | | |
|---|---|---|---|
| 2021/0084341 A1* | 3/2021 | Ray | H04N 19/186 |
| 2021/0092393 A1* | 3/2021 | Chao | H04N 19/50 |
| 2022/0159241 A1* | 5/2022 | Zhu | H04N 19/105 |

FOREIGN PATENT DOCUMENTS

| | | |
|---|---|---|
| KR | 20180053702 A | 5/2018 |
| KR | 20190057159 A | 5/2019 |

* cited by examiner

FIG. 4
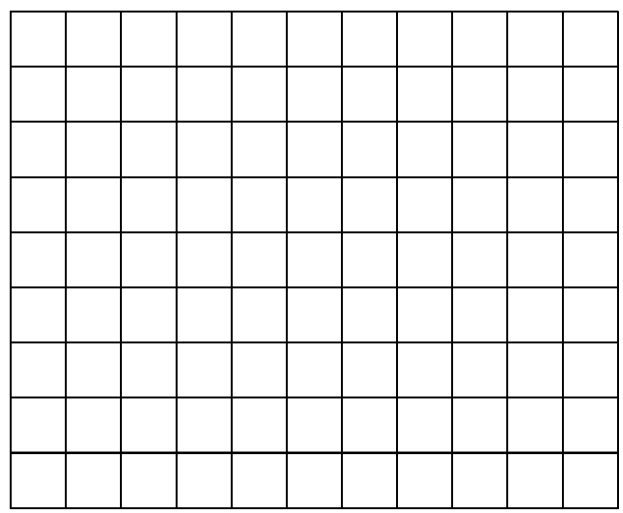
FIG. 5
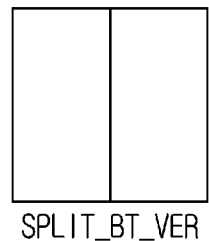
SPLIT_BT_VER
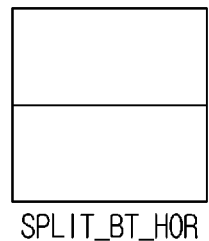
SPLIT_BT_HOR
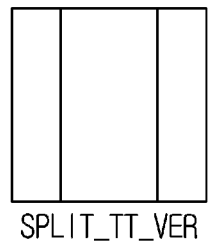
SPLIT_TT_VER
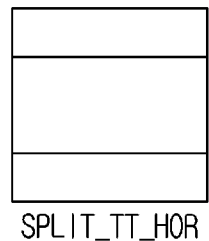
SPLIT_TT_HOR

FIG. 10A

| coding_tree( x0, y0, cbWidth, cbHeight, qgOnY, qgOnC, cbSubdiv, cqtDepth, mttDepth, depthOffset, partIdx, treeTypeCurr, modeTypeCurr ) { | Descriptor |
|---|---|
| if( ( allowSplitBtVer \|\| allowSplitBtHor \|\| allowSplitTtVer \|\| allowSplitTtHor \|\| allowSplitQT ) <br> && ( x0 + cbWidth <= pic_width_in_luma_samples ) <br> && ( y0 + cbHeight <= pic_height_in_luma_samples ) ) | |
| split_cu_flag | ae(v) |
| if( cu_qp_delta_enabled_flag && qgOnY && cbSubdiv <= cu_qp_delta_subdiv ) { | |
| IsCuQpDeltaCoded = 0 | |
| CuQpDeltaVal = 0 | |
| CuQgTopLeftX = x0 | |
| CuQgTopLeftY = y0 | |
| } | |
| if( cu_chroma_qp_offset_enabled_flag && qgOnC && <br> cbSubdiv <= cu_chroma_qp_offset_subdiv ) | |
| IsCuChromaQpOffsetCoded = 0 | |
| if( split_cu_flag ) { | |
| if( ( allowSplitBtVer \|\| allowSplitBtHor \|\| allowSplitTtVer \|\| allowSplitTtHor ) && <br> allowSplitQT ) | |
| split_qt_flag | ae(v) |
| if( !split_qt_flag ) { | |
| if( ( allowSplitBtHor \|\| allowSplitTtHor ) && <br> ( allowSplitBtVer \|\| allowSplitTtVer ) ) | |
| mtt_split_cu_vertical_flag | ae(v) |
| if( ( allowSplitBtVer && allowSplitTtVer && mtt_split_cu_vertical_flag ) \|\| <br> ( allowSplitBtHor && allowSplitTtHor && !mtt_split_cu_vertical_flag ) ) | |
| mtt_split_cu_binary_flag | ae(v) |
| } | |
| if( modeTypeCondition == 1 ) | |
| modeType = MODE_TYPE_INTRA | |
| else if( modeTypeCondition == 2 ) { | |
| mode_constraint_flag | ae(v) |
| modeType = mode_constraint_flag ? MODE_TYPE_INTRA : MODE_TYPE_INTER | |
| } else { | |
| modeType = modeTypeCurr | |
| } | |
| treeType = ( modeType == MODE_TYPE_INTRA ) ? DUAL_TREE_LUMA : treeTypeCurr | |

(annotations: 1010, 1020, 1030, 1040, 1050, 1060)

FIG. 10B

| | |
|---|---|
| if( !split_qt_flag ) { | |
|   if( MttSplitMode[ x0 ][ y0 ][ mttDepth ] == SPLIT_BT_VER ) { | |
|     depthOffset += ( x0 + cbWidth > pic_width_in_luma_samples ) ? 1 : 0 | |
|     x1 = x0 + ( cbWidth / 2 ) | |
|     coding_tree( x0, y0, cbWidth / 2, cbHeight, qgOnY, qgOnC, cbSubdiv + 1,<br>                cqtDepth, mttDepth + 1, depthOffset, 0, treeType, modeType ) | |
|     if( x1 < pic_width_in_luma_samples ) | |
|       coding_tree( x1, y0, cbWidth / 2, cbHeightY, qgOnY, qgOnC, cbSubdiv + 1,<br>                cqtDepth, mttDepth + 1, depthOffset, 1, treeType, modeType ) | |
|   } else if( MttSplitMode[ x0 ][ y0 ][ mttDepth ] == SPLIT_BT_HOR ) { | |
|     depthOffset += ( y0 + cbHeight > pic_height_in_luma_samples ) ? 1 : 0 | |
|     y1 = y0 + ( cbHeight / 2 ) | |
|     coding_tree( x0, y0, cbWidth, cbHeight / 2, qgOnY, qgOnC, cbSubdiv + 1,<br>                cqtDepth, mttDepth + 1, depthOffset, 0, treeType, modeType ) | |
|     if( y1 < pic_height_in_luma_samples ) | |
|       coding_tree( x0, y1, cbWidth, cbHeight / 2, qgOnY, qgOnC, cbSubdiv + 1,<br>              cqtDepth, mttDepth + 1, depthOffset, 1, treeType, modeType ) | |
|   } else if( MttSplitMode[ x0 ][ y0 ][ mttDepth ] == SPLIT_TT_VER ) { | |
|     x1 = x0 + ( cbWidth / 4 ) | |
|     x2 = x0 + ( 3 * cbWidth / 4 ) | |
|     qgOnY = qgOnY && ( cbSubdiv + 2 <= cu_qp_delta_subdiv ) | |
|     qgOnC = qgOnC && ( cbSubdiv + 2 <= cu_chroma_qp_offset_subdiv ) | |
|     coding_tree( x0, y0, cbWidth / 4, cbHeight, qgOnY, qgOnC, cbSubdiv + 2,<br>              cqtDepth, mttDepth + 1, depthOffset, 0, treeType, modeType ) | |
|     coding_tree( x1, y0, cbWidth / 2, cbHeight, qgOnY, qgOnC, cbSubdiv + 1,<br>              cqtDepth, mttDepth + 1, depthOffset, 1, treeType, modeType ) | |
|     coding_tree( x2, y0, cbWidth / 4, cbHeight, qgOnY, qgOnC, cbSubdiv + 2,<br>              cqtDepth, mttDepth + 1, depthOffset, 2, treeType, modeType ) | |
|   } else { /* SPLIT_TT_HOR */ | |
|     y1 = y0 + ( cbHeight / 4 ) | |
|     y2 = y0 + ( 3 * cbHeight / 4 ) | |
|     qgOnY = qgOnY && ( cbSubdiv + 2 <= cu_qp_delta_subdiv ) | |
|     qgOnC = qgOnC && ( cbSubdiv + 2 <= cu_chroma_qp_offset_subdiv ) | |
|     coding_tree( x0, y0, cbWidth, cbHeight / 4, qgOnY, qgOnC, cbSubdiv + 2,<br>              cqtDepth, mttDepth + 1, depthOffset, 0, treeType, modeType ) | |
|     coding_tree( x0, y1, cbWidth, cbHeight / 2, qgOnY, qgOnC, cbSubdiv + 1,<br>              cqtDepth, mttDepth + 1, depthOffset, 1, treeType, modeType ) | |
|     coding_tree( x0, y2, cbWidth, cbHeight / 4, qgOnY, qgOnC, cbSubdiv + 2,<br>              cqtDepth, mttDepth + 1, depthOffset, 2, treeType, modeType ) | |
|   } | |
| } | |

1070 (indicates section above)

FIG. 10C

| | |
|---|---|
| } else { | |
|   x1 = x0 + ( cbWidth / 2 ) | |
|   y1 = y0 + ( cbHeight / 2 ) | |
|   coding_tree( x0, y0, cbWidth / 2, cbHeight / 2, qgOnY, qgOnC, cbSubdiv + 2,<br>              cqtDepth + 1, 0, 0, 0, treeType, modeType ) | |
|   if( x1 < pic_width_in_luma_samples ) | |
|     coding_tree( x1, y0, cbWidth / 2, cbHeight / 2, qgOnY, qgOnC, cbSubdiv + 2,<br>              cqtDepth + 1, 0, 0, 1, treeType, modeType ) | |
|   if( y1 < pic_height_in_luma_samples ) | |
|     coding_tree( x0, y1, cbWidth / 2, cbHeight / 2, qgOnY, qgOnC, cbSubdiv + 2,<br>              cqtDepth + 1, 0, 0, 2, treeType, modeType ) | |
|   if( y1 < pic_height_in_luma_samples && x1 < pic_width_in_luma_samples ) | |
|     coding_tree( x1, y1, cbWidth / 2, cbHeight / 2, qgOnY, qgOnC, cbSubdiv + 2,<br>              cqtDepth + 1, 0, 0, 3, treeType, modeType ) | |
| } | |
| if( modeTypeCur == MODE_TYPE_ALL && modeType == MODE_TYPE_INTRA ) { | |
|   coding_tree( x0, y0, cbWidth, cbHeight, qgOnY, qgOnC, cbSubdiv, cqtDepth, mttDepth, 0, 0<br>              DUAL_TREE_CHROMA, modeType ) | |
| } | |

1080 (indicates section above)

FIG. 17

| | Descriptor |
|---|---|
| coding_unit( x0, y0, cbWidth, cbHeight, cqtDepth, treeType, modeType ) { | |
| chType = treeType = = DUAL_TREE_CHROMA? 1 : 0 | |
| if( slice_type != I \|\| sps_ibc_enabled_flag \|\| sps_palette_enabled_flag) { | |
| if( treeType != DUAL_TREE_CHROMA &&<br>!( ( ( cbWidth = = 4 && cbHeight = = 4 ) \| modeType = = MODE_TYPE_INTRA )<br>&& !sps_ibc_enabled_flag ) ) | |
| cu_skip_flag[ x0 ][ y0 ] | ae(v) |
| if( cu_skip_flag[ x0 ][ y0 ] = = 0 && slice_type != I<br>&& !( cbWidth = = 4 && cbHeight = = 4 ) && modeType = = MODE_TYPE_ALL ) | |
| pred_mode_flag | ae(v) |
| if( ( ( slice_type = = I && cu_skip_flag[ x0 ][ y0 ] = =0 ) \|<br>( slice_type != I && ( CuPredMode[ chType ][ x0 ][ y0 ] != MODE_INTRA \|\|<br>( cbWidth = = 4 && cbHeight = = 4 && cu_skip_flag[ x0 ][ y0 ] = = 0 ) ) ) ) &&<br>cbWidth <= 64 && cbHeight <= 64 && modeType != MODE_TYPE_INTER &&<br>sps_ibc_enabled_flag && treeType != DUAL_TREE_CHROMA ) | |
| pred_mode_ibc_flag | ae(v) |
| if( ( ( ( slice_type  = = I \|\| ( cbWidth = = 4 && cbHeight = = 4 ) \|\| sps_ibc_enabled_flag ) &&<br>CuPredMode[ x0 ][ y0 ] = = MODE_INTRA ) \|\|<br>( slice_type != I && !( cbWidth = = 4 && cbHeight = = 4 ) && !sps_ibc_enabled_flag<br>&& CuPredMode[ x0 ][ y0 ] != MODE_INTRA ) ) && sps_palette_enabled_flag &&<br>cbWidth <= 64 && cbHeight <= 64 && && cu_skip_flag[ x0 ][ y0 ] = = 0 &&<br>modeType != MODE_INTER ) | |
| pred_mode_plt_flag | ae(v) |
| } | |
| ... | |

FIG. 18A

| | Descriptor |
|---|---|
| palette_coding( x0, y0, cbWidth, cbHeight, startComp, numComps ) { | |
| palettePredictionFinished = 0 | |
| NumPredictedPaletteEntries = 0 | |
| for( predictorEntryIdx = 0; predictorEntryIdx < PredictorPaletteSize[ startComp ] &&<br>!palettePredictionFinished &&<br>NumPredictedPaletteEntries[ startComp ] < palette_max_size; predictorEntryIdx++ ) { | |
| palette_predictor_run | ae(v) |
| if( palette_predictor_run != 1 ) { | |
| if( palette_predictor_run > 1 ) | |
| predictorEntryIdx += palette_predictor_run − 1 | |
| PalettePredictorEntryReuseFlags[ predictorEntryIdx ] = 1 | |
| NumPredictedPaletteEntries++ | |
| } else | |
| palettePredictionFinished = 1 | |
| } | |
| if( NumPredictedPaletteEntries < palette_max_size ) | |
| num_signalled_palette_entries | ae(v) |
| for( cIdx = startComp; cIdx < ( startComp + numComps); cIdx++ ) | |
| for( i = 0; i < num_signalled_palette_entries; i++ ) | |
| new_palette_entries[ cIdx ][ i ] | ae(v) |

FIG. 18B

| | |
|---|---|
| if( CurrentPaletteSize[ startComp ] > 0 ) | |
|     palette_escape_val_present_flag | ae(v) |
| if( MaxPaletteIndex > 0 ) { | |
|     num_palette_indices_minus1 | ae(v) |
|     adjust = 0 | |
|     for( i = 0; i <= num_palette_indices_minus1; i++ ) { | |
|       if( MaxPaletteIndex − adjust > 0 ) { | |
|         palette_idx_idc | ae(v) |
|         PaletteIndexIdc[ i ] = palette_idx_idc | |
|       } | |
|       adjust = 1 | |
|     } | |
|     copy_above_indices_for_final_run_flag | ae(v) |
|     palette_transpose_flag | ae(v) |
| } | |
| if( treeType != DUAL_TREE_CHROMA && palette_escape_val_present_flag ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
| } | |
| if( treeType != DUAL_TREE_LUMA && palette_escape_val_present_flag ) { | |
|     if( cu_chroma_qp_offset_enabled_flag && !IsCuChromaQpOffsetCoded ) { | |
|       cu_chroma_qp_offset_flag | ae(v) |
|       if( cu_chroma_qp_offset_flag ) | |
|         cu_chroma_qp_offset_idx | ae(v) |
|     } | |
| } | |

FIG. 18C

| | |
|---|---|
| remainingNumIndices = num_palette_indices_minus1 + 1 | |
| PaletteScanPos = 0 | |
| log2CbWidth = Log2( cbWidth ) | |
| log2CbHeight = Log2( cbHeight ) | |
| while( PaletteScanPos < cbWidth*cbHeightt ) { | |
|    xC = x0 + TraverseScanOrder[ log2CbWidth ][ log2CbHeight ][ PaletteScanPos ][ 0 ] | |
|    yC = y0 + TraverseScanOrder[ log2CbWidth ][ log2CbHeight ][ PaletteScanPos ][ 1 ] | |
|    if( PaletteScanPos > 0 ) { | |
|      xcPrev = x0 + TraverseScanOrder[ log2CbWidth ][ log2CbHeight ][ PaletteScanPos − 1 ][ 0 ] | |
|      ycPrev = y0 + TraverseScanOrder[ log2CbWidth ][ log2CbHeight ][ PaletteScanPos − 1 ][ 1 ] | |
|    } | |
|    PaletteRunMinus1 = cbWidth * cbHeight − PaletteScanPos − 1 | |
|    RunToEnd = 1 | |
|    CopyAboveIndicesFlag[ xC ][ yC ] = 0 | |
|    if( MaxPaletteIndex > 0 ) | |
|      if( ( ( !palette_transpose_flag && yC > 0 ) || ( palette_transpose_flag && xC > 0 ) ) && CopyAboveIndicesFlag[ xcPrev ][ ycPrev ] == 0 ) | |
|        if( remainingNumIndices > 0 && PaletteScanPos < cbWidth* cbHeight − 1 ) { | |
|          copy_above_palette_indices_flag | ae(v) |
|          CopyAboveIndicesFlag[ xC ][ yC ] = copy_above_palette_indices_flag | |
|        } else { | |
|          if( PaletteScanPos == cbWidth * cbHeight − 1 && remainingNumIndices > 0 ) | |
|            CopyAboveIndicesFlag[ xC ][ yC ] = 0 | |
|         else | |
|            CopyAboveIndicesFlag[ xC ][ yC ] = 1 | |
|        } | |

FIG. 18D

| | |
|---|---|
|    if ( CopyAboveIndicesFlag[ xC ][ yC ] == 0 ) { | |
|      currNumIndices = num_palette_indices_minus1 + 1 − remainingNumIndices | |
|      PaletteIndexMap[ xC ][ yC ] = PaletteIndexIdc[ currNumIndices ] | |
|    } | |
|    if( MaxPaletteIndex > 0 ) { | |
|      if( CopyAboveIndicesFlag[ xC ][ yC ] == 0 ) | |
|        remainingNumIndices −= 1 | |
|      if( remainingNumIndices > 0 || CopyAboveIndicesFlag[ xC ][ yC ] != copy_above_indices_for_final_run_flag ) { | |
|        PaletteMaxRunMinus1 = cbWidth * cbHeight − PaletteScanPos − 1 − remainingNumIndices − copy_above_indices_for_final_run_flag | |
|        RunToEnd = 0 | |
|        if( PaletteMaxRunMinus1 > 0 ) { | |
|          palette_run_prefix | ae(v) |
|          if( ( palette_run_prefix > 1 ) && ( PaletteMaxRunMinus1 != ( 1 << ( palette_run_prefix − 1 ) ) ) ) | |
|            palette_run_suffix | ae(v) |
|          } | |
|        } | |
|      } | |

FIG. 18E

| | |
|---|---|
| runPos = 0 | |
| while ( runPos <= PaletteRunMinus1 ) { | |
|     xR = x0 + TraverseScanOrder[ log2CbWidth ][ log2CbHeight ][ PaletteScanPos ][ 0 ] | |
|     yR = y0 + TraverseScanOrder[ log2CbWidth ][ log2CbHeight ][ PaletteScanPos ][ 1 ] | |
|     if( CopyAboveIndicesFlag[ xC ][ yC ] = = 0 ) { | |
|         CopyAboveIndicesFlag[ xR ][ yR ] = 0 | |
|         PaletteIndexMap[ xR ][ yR ] = PaletteIndexMap[ xC ][ yC ] | |
|     } else { | |
|         CopyAboveIndicesFlag[ xR ][ yR ] = 1 | |
|         if( !palette_transpose_flag ) | |
|             PaletteIndexMap[ xR ][ yR ] = PaletteIndexMap[ xR ][ yR − 1 ] | |
|         else | |
|             PaletteIndexMap[ xR ][ yR ] = PaletteIndexMap[ xR − 1 ][ yR ] | |
|     } | |
|     runPos++ | |
|     PaletteScanPos ++ | |
|     } | |
| } | |
| if( palette_escape_val_present_flag ) { | |
|     for( cIdx = startComp; cIdx < ( startComp + numComps ); cIdx++ ) | |
|         for( sPos = 0; sPos < cbWidth* cbHeight; sPos++ ) { | |
|             xC = x0 + TraverseScanOrder[ log2CbWidth ][ log2CbHeight ][ sPos ][ 0 ] | |
|             yC = y0 + TraverseScanOrder[ log2CbWidth ][ log2CbHeight ][ sPos ][ 1 ] | |
|             if( PaletteIndexMap[ cIdx ][ xC ][ yC ] = = MaxPaletteIndex ) { | |
|                 palette_escape_val | ae(v) |
|                 PaletteEscapeVal[ cIdx ][ xC ][ yC ] = palette_escape_val | |
|             } | |
|         } | |
|     } | |
| } | |

FIG. 25

- If modeType is MODE_TYPE_ALL, the variable PredictorPaletteSize[startComp] and the array PredictorPaletteEntries are derived or modified as follows:

for( i = 0; i < CurrentPaletteSize[ startComp ]; i++ )
       for( cIdx = startComp; cIdx < (startComp + numComps); cIdx++ )
          newPredictorPaletteEntries[ cIdx ][ i ] = CurrentPaletteEntries[ cIdx ][ i ]
    newPredictorPaletteSize = CurrentPaletteSize[ startComp ]
    for( i = 0; i < PredictorPaletteSize && newPredictorPaletteSize < PaletteMaxPredictorSize; i++ )
       if( !PalettePredictorEntryReuseFlags[ i ] ) {
          for( cIdx = startComp; cIdx < (startComp + numComps); cIdx++ )
             newPredictorPaletteEntries[ cIdx ][ newPredictorPaletteSize ] =
                PredictorPaletteEntries[ cIdx ][ i ]
          newPredictorPaletteSize++
       }
    for( cIdx = startComp; cIdx < ( startComp + numComps ); cIdx++ )
       for( i = 0; i < newPredictorPaletteSize; i++ )
          PredictorPaletteEntries[ cIdx ][ i ] = newPredictorPaletteEntries[ cIdx ][ i ]
    PredictorPaletteSize[ startComp ] = newPredictorPaletteSize It is a requirement of bitstream conformance that the value of PredictorPaletteSize[ startComp ] shall be in the range of 0 to PaletteMaxPredictorSize, inclusive.

FIG. 28

| coding_unit( x0, y0, cbWidth, cbHeight, cqtDepth, treeType, modeType ) { | Descriptor |
|---|---|
| chType = treeType == DUAL_TREE_CHROMA? 1 : 0 | |
| if( slice_type != I \|\| sps_ibc_enabled_flag \|\| sps_palette_enabled_flag) { | |
| if( treeType != DUAL_TREE_CHROMA && <br> !( ( ( cbWidth == 4 && cbHeight == 4 ) \|\| modeType == MODE_TYPE_INTRA ) <br> && !sps_ibc_enabled_flag ) ) | |
| cu_skip_flag[ x0 ][ y0 ] | ae(v) |
| if( cu_skip_flag[ x0 ][ y0 ] == 0 && slice_type != I <br> && !( cbWidth == 4 && cbHeight == 4 ) && modeType == MODE_TYPE_ALL ) | |
| pred_mode_flag | ae(v) |
| if( ( ( slice_type == I && cu_skip_flag[ x0 ][ y0 ] == 0 ) \|\| <br> ( slice_type != I && ( CuPredMode[ chType ][ x0 ][ y0 ] != MODE_INTRA \|\| <br> ( cbWidth == 4 && cbHeight == 4 && cu_skip_flag[ x0 ][ y0 ] == 0 ) ) ) ) && <br> cbWidth <= 64 && cbHeight <= 64 && modeType != MODE_TYPE_INTER && <br> sps_ibc_enabled_flag && treeType != DUAL_TREE_CHROMA ) | |
| pred_mode_ibc_flag | ae(v) |
| if( ( ( ( slice_type == I \|\| ( cbWidth == 4 && cbHeight == 4 ) \|\| sps_ibc_enabled_flag ) && <br> CuPredMode[ x0 ][ y0 ] == MODE_INTRA ) \|\| <br> ( slice_type != I && !( cbWidth == 4 && cbHeight == 4 ) && !sps_ibc_enabled_flag <br> && CuPredMode[ x0 ][ y0 ] != MODE_INTRA ) ) && sps_palette_enabled_flag && <br> cbWidth <= 64 && cbHeight <= 64 && && cu_skip_flag[ x0 ][ y0 ] == 0 && <br> modeType == MODE_TYPE_ALL ) | |
| pred_mode_plt_flag | ae(v) |
| } | |
| ... | |

IMAGE ENCODING/DECODING METHOD AND DEVICE USING PALETTE MODE, AND METHOD FOR TRANSMITTING BITSTREAM

CROSS-REFERENCE TO RELATED APPLICATIONS

This application is a Bypass of PCT Application No. Application No. PCT/KR2020/012898, with an international filing date of Sep. 23, 2020, which claims the benefit of U.S. Provisional Application No. 62/904,578, filed on Sep. 23, 2019, all of which are incorporated by reference in their entirety herein.

TECHNICAL FIELD

The present disclosure relates to an image encoding/decoding method and apparatus using a palette mode and a method for transmitting a bitstream, and, more particularly, to an image encoding/decoding method and apparatus for selectively updating a palette predictor based on a split structure of a current block, and a method for transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

An object of the present disclosure is to provide an image encoding/decoding method and apparatus using a palette mode.

An object of the present disclosure is to provide an image encoding/decoding method and apparatus for selectively updating a palette predictor based on a split structure of a current block.

An object of the present disclosure is to provide an image encoding/decoding method and apparatus for selectively applying a palette mode based on a split structure of a current block.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise obtaining palette information and palette index prediction information of a current block from a bitstream, based on a palette mode applying for the current block, constructing a palette predictor for the current block based on the palette information and constructing a palette table for the current block based on the palette predictor, generating a palette index map for the current block based on the palette index prediction information, and decoding the current block based on the palette table and the palette index map, The palette predictor may be selectively updated based on a split structure of the current block.

In addition, an image decoding apparatus according to an aspect of the present disclosure may comprise a memory and at least one processor. The at least one processor may obtain palette information and palette index prediction information of a current block from a bitstream, based on a palette mode applying for the current block, construct a palette predictor for the current block based on the palette information and construct a palette table for the current block based on the palette predictor, generate a palette index map for the current block based on the palette index prediction information, and decode the current block based on the palette table and the palette index map. The palette predictor is selectively updated based on a split structure of the current block.

In addition, an image encoding method performed by an image encoding apparatus according to an aspect of the present disclosure may comprise, based on a palette mode applying for a current block, constructing a palette predictor for the current block and constructing a palette table for the current block based on the palette predictor, generating a palette index map for the current block based on the palette table, and encoding the current block based on the palette index map. The palette predictor is selectively updated based on a split structure of the current block.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

According to the present disclosure, it is possible to provide an image encoding/decoding method and apparatus based on an improved palette mode.

According to the present disclosure, it is possible to provide an image encoding/decoding method and apparatus for selectively applying a palette mode based on a split structure of a current block.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 4 is a view showing a partitioning structure of an image according to an embodiment.

FIG. 5 is a view showing an embodiment of a partitioning type of a block according to a multi-type tree structure.

FIGS. 10A to 10C are views illustrating an example of syntax for switching a single tree structure to a dual tree structure.

FIG. 17 is a view illustrating some of coding_unit syntax for a palette mode.

FIGS. 18A to 18E are views illustrating palette_coding syntax for a palette mode.

FIG. 25 is a view illustrating an example of a process of selectively updating a palette predictor based on a split structure of a current block.

FIG. 28 is a view illustrating a detailed example of coding_unit syntax including a palette mode flag.

MODE FOR INVENTION

Figure 1:
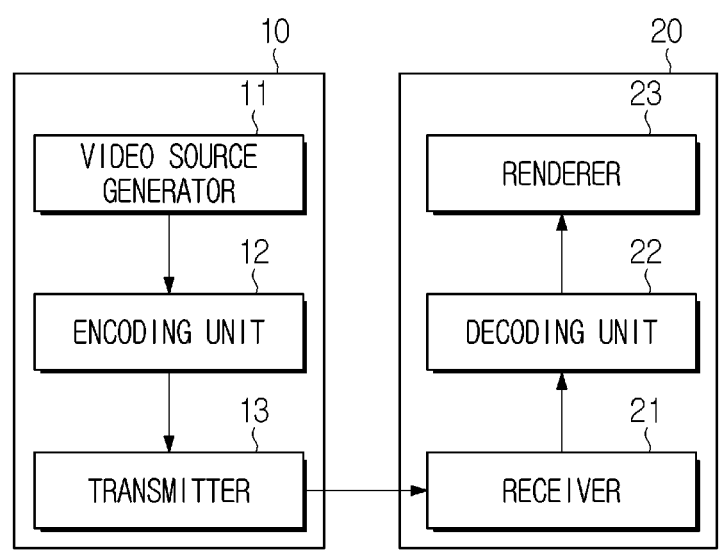
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit specifying one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The chroma component block of the current block may be expressed by including an explicit description of a luma component block, such as "luma block" or "current luma block". In addition, the chroma component block of the current block may be explicitly expressed by including an explicit description of the chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
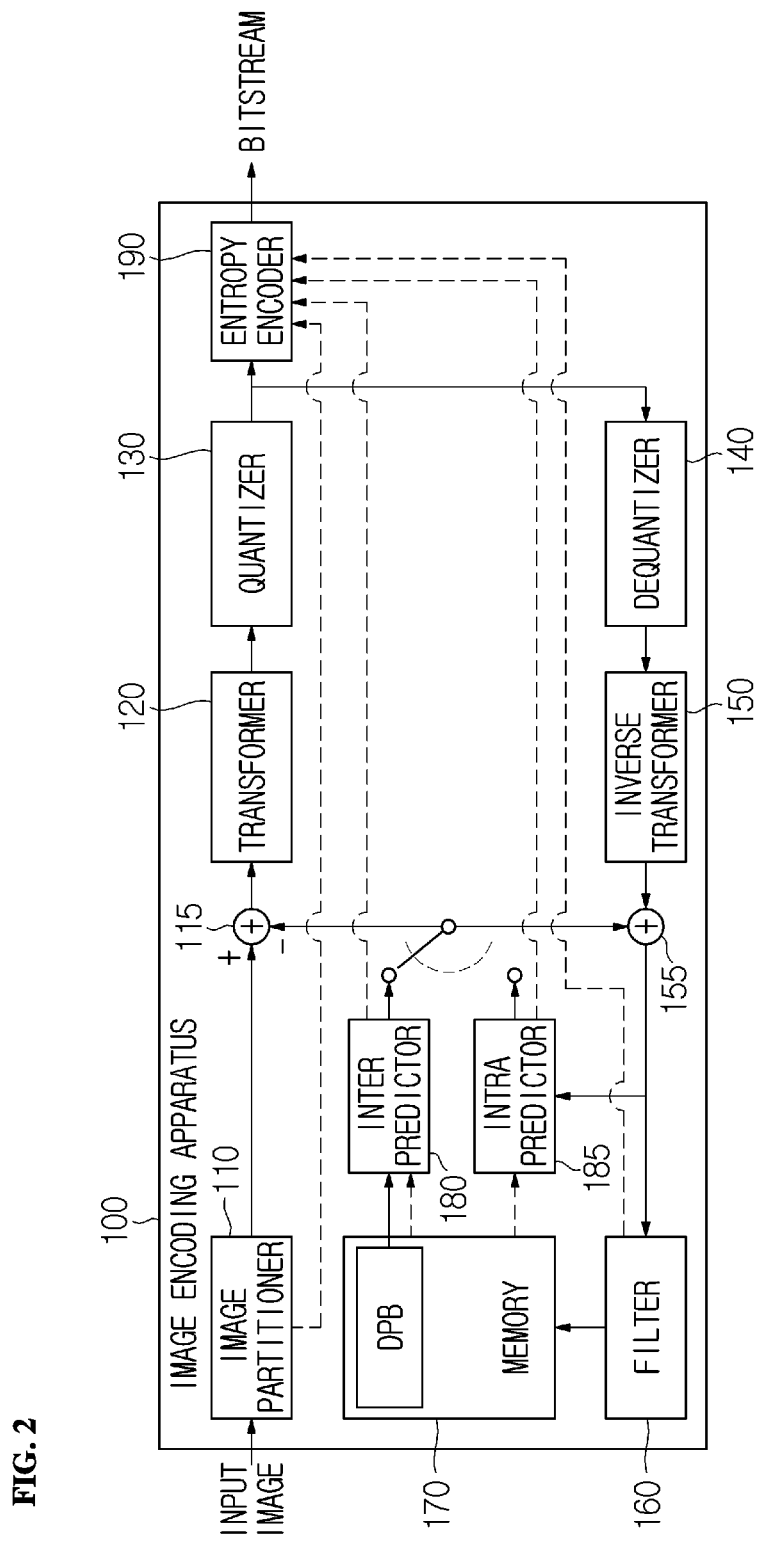
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied for the current block by using a prediction mode applied for a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector)

corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied for square pixel blocks having the same size or may be applied for blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
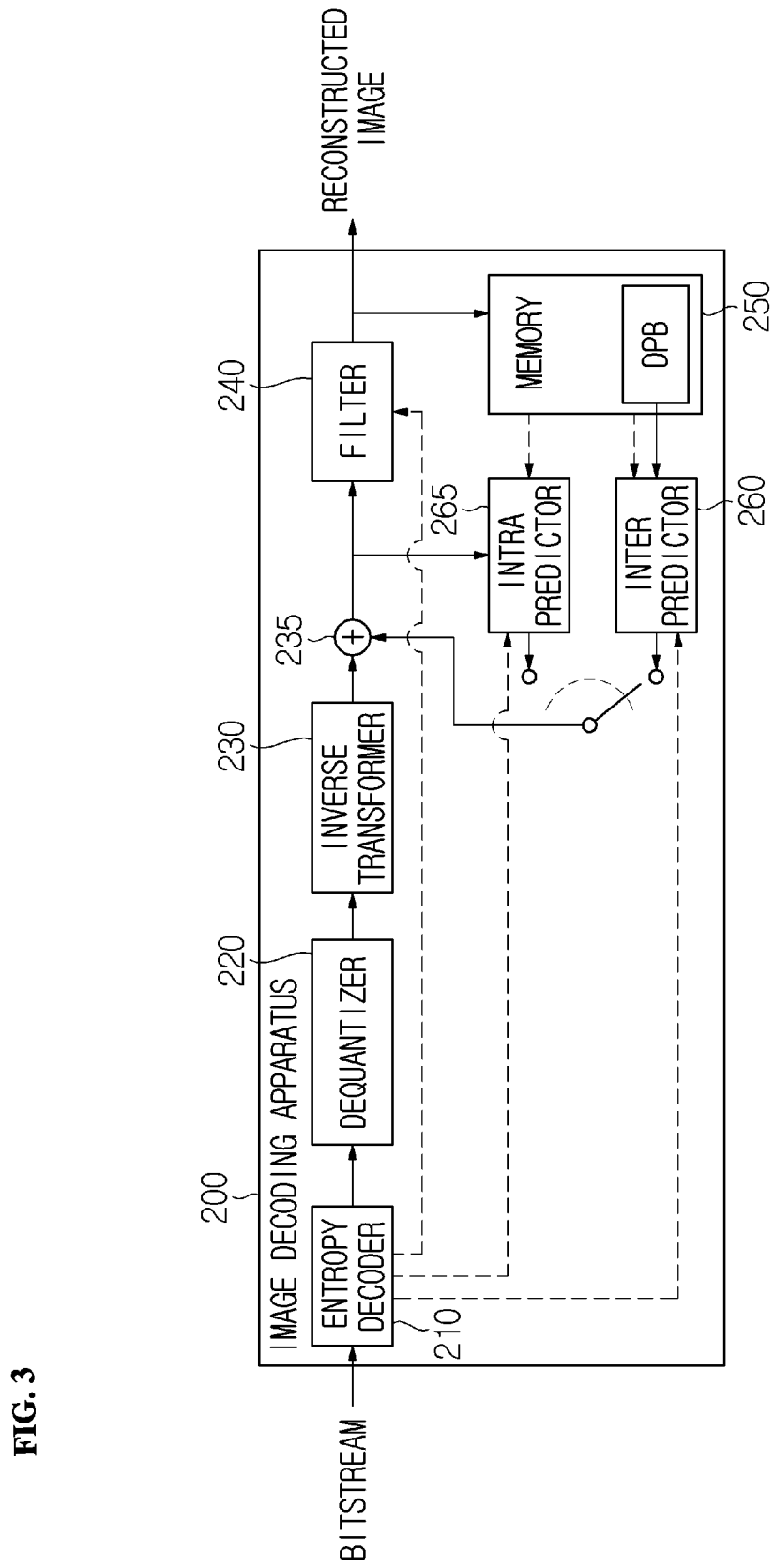
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied for the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied for the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied for the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 5 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
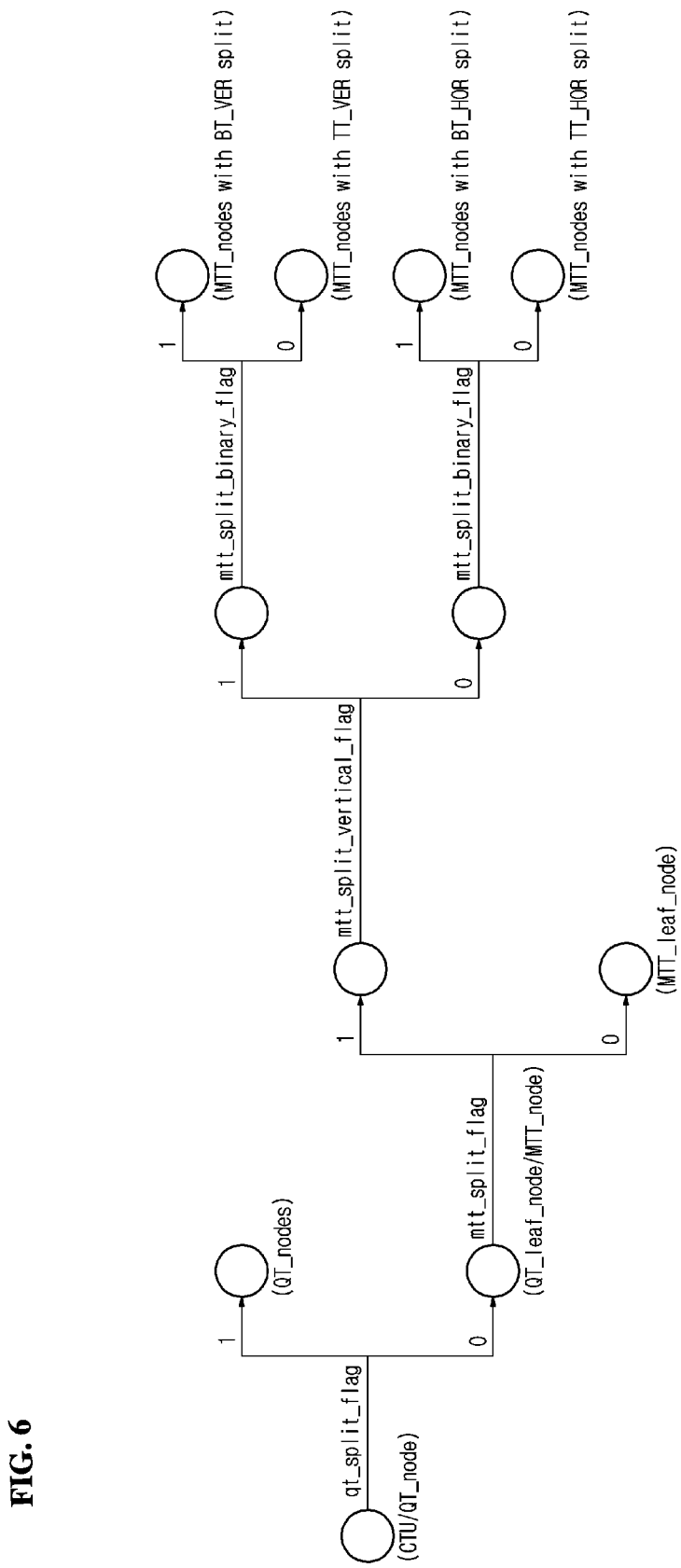
FIG. 6 is a view showing a signaling mechanism of block splitting information in a quadtree with nested multi-type tree structure according to the present disclosure.

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) specifying whether quadtree splitting is performed on the current CU (CTU or node (QT_node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to specify whether the current node is additionally partitioned. If the corresponding node is additionally partitioned (e.g., if the first flag is 1), a second flag (e.g., Mtt_split_cu_vertical_flag) may be signaled to specify the splitting direction. For example, the splitting direction may be a vertical direction if the second flag is 1 and may be a horizontal direction if the second flag is 0. Then, a third flag (e.g., Mtt_split_cu_binary_flag) may be signaled to specify whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

TABLE 1

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
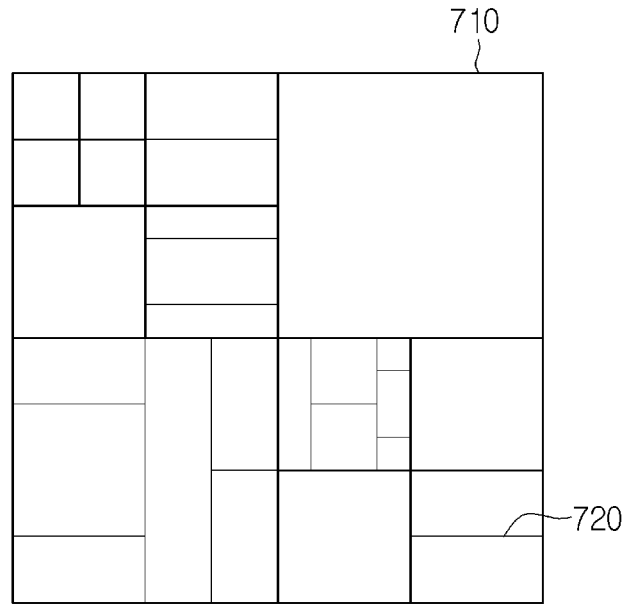
FIG. 7 is a view showing an embodiment in which a CTU is partitioned into multiple CUs.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning. The CU may correspond to a coding block (CB). In an embodiment, the CU may include a coding block of luma samples and two coding blocks of chroma samples corresponding to the luma samples.

A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally means a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size which is a parameter specifying the root node size of a quadtree, MinQTSize which is a parameter specifying the minimum allowed quadtree leaf node size, MaxBtSize which is a parameter specifying the maximum allowed binary tree root node size, MaxTtSize which is a parameter specifying the maximum allowed ternary tree root node size, MaxMttDepth which is a parameter specifying the maximum allowed hierarchy depth of multi-type tree splitting from a quadtree leaf node, MinBtSize which is a parameter specifying the minimum allowed binary tree leaf node size, or MinTtSize which is a parameter specifying the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied for the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multitype tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied for the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

Figure 8:
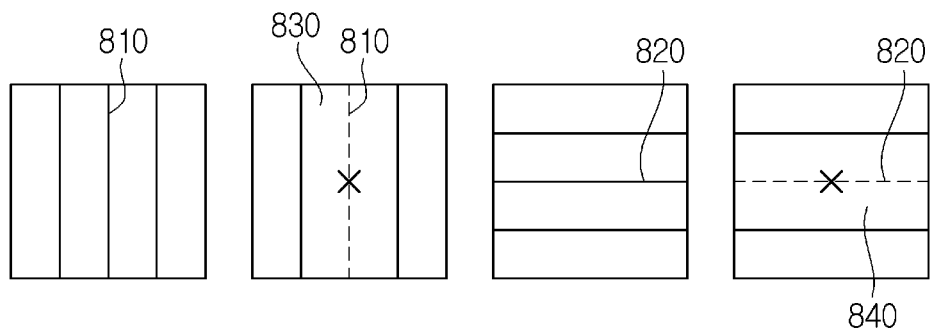
FIG. 8 is a view illustrating an embodiment of a redundant split pattern.

For example, FIG. 8 shows redundant splitting patterns which may occur in binary tree splitting and ternary tree splitting. As shown in FIG. 8, continuous binary splitting 810 and 820 for one direction of two-step levels have the same coding block structure as binary splitting for a center partition after ternary splitting. In this case, binary tree splitting for center blocks 830 and 840 of ternary tree splitting may be prohibited. this prohibition is applicable to CUs of all pictures. When such specific splitting is prohibited, signaling of corresponding syntax elements may be modified by reflecting this prohibited case, thereby reducing the number of bits signaled for splitting. For example, as shown in the example shown in FIG. 8, when binary tree splitting for the center block of the CU is prohibited, a syntax element mtt_split_cu_binary_flag specifying whether splitting is binary splitting or ternary splitting is not signaled and the value thereof may be derived as 0 by a decoding apparatus.

Overview of Chroma Format

A source or a coded picture/image may include a luma component (Y) block and two chroma component (cb and cr) blocks. That is, one pixel of a picture/image may include a luma sample and two chroma samples (cb and cr). A chroma format may mean a configuration format of a luma sample and chroma samples (cb and cr) and may be referred to as a color format. The chroma format may be predetermined or adaptively signaled. For example, the chroma format may be signaled based on at least one of chroma_format_idc or separate_colour_plane_flag, as shown in Table 2. At least one of chroma_format_idc or separate_colour_plane_flag may be signaled through higher level syntax such as DPS, VPS, SPS or PPS. For example, chroma_format_idc and separate_colour_plane_flag may be included in SPS syntax.

TABLE 2

| chroma_format_idc | separate_colour_plane_flag | ChromaArray Type | Chroma format | SubWidthC | SubHeightC |
|---|---|---|---|---|---|
| 0 | 0 | 0 | Monochrome | 1 | 1 |
| 1 | 0 | 1 | 4:2:0 | 2 | 2 |
| 2 | 0 | 2 | 4:2:2 | 2 | 1 |
| 3 | 0 | 3 | 4:4:4 | 1 | 1 |
| 3 | 1 | 0 | 4:4:4 | 1 | 1 |

Referring to Table 2, chroma_format_idc may specify a format of a luma sample and a chroma sample corresponding thereto, and separate_colour_plane_flag may specify whether three color components Y, Cb and Cr are separately encoded in a 4:4:4 chroma format.

When chroma_format_idc is 0, the chroma format corresponds to a monochrome format, and a current block may not include a chroma component block but may include only a luma component block.

Alternatively, when chroma_format_idc is 1, the chroma format corresponds to a 4:2:0 chroma format, and a width and height of a chroma component block may correspond to half those of the luma component block, respectively.

Alternatively, when chroma_format_idc is 2, the chroma format corresponds to a 4:2:2 chroma format, the width of the chroma component block may correspond to half that of the luma component block, and the height of the chroma component block may be equal to that of the luma component block.

Alternatively, when chroma_format_idc is 3, the chroma format corresponds to a 4:4:4 chroma format, and the width and height of the chroma component block may be equal to those of the luma component block, respectively.

SubWidthC and SubHeightC may specify a ratio of a luma sample and a chroma sample. For example, when the width and height of the luma component block are respectively CbWidth and CbHeight, the width and height of the chroma component block may be derived as (CbWidth/SubwidthC) and (CbHeight/SubHeightC), respectively.

Minimum Size Limit of Chroma Block

In an image encoding/decoding process, a size of a chroma block may have a great effect on throughput. For example, when a chroma block having a predetermined size or less is excessively generated, throughput of the image encoding/decoding process may significantly deteriorate. In order to solve such a problem, CU splitting may be limited not to generate a chroma block having a predetermined size or less.

The image encoding/decoding apparatus may set a minimum size of a chroma block. In an example, the chroma block may be limited to include at least 16 chroma samples. For example, splitting of a luma block or a chroma block may be limited not to generate a 2×2, 2×4 or 4×2 chroma block. As a result, in a dual tree structure, quadtree splitting and/or binary splitting for a 2×8, 4×4 or 8×2 chroma block may be limited. In addition, in the dual tree structure, ternary splitting for a 2×8, 2×16, 4×4, 4×8, 8×2 or 8×4 chroma block may be limited.

Specifically, when any one of the following conditions 1-1 to 1-4 is satisfied, quadtree splitting for a current block may be limited.

(Condition 1-1) the split structure of the current block is single tree or dual tree luma and a size of a luma block is equal to or less than a minimum size capable of quadtree splitting (Condition 1-2) the split structure of the current block is dual tree chroma and a size of a chroma block is equal to or less than a minimum size capable of quadtree splitting (Condition 1-3) the split structure of the current block is dual tree chroma and a size of a chroma block is equal to or less than 4

(Condition 1-4) the split structure of the current block is dual tree chroma and a prediction mode type of the current block is MODE_TYPE_INTRA Alternatively, when any one of the following conditions 2-1 to 2-2 is satisfied, binary splitting for a current block may be limited.

(Condition 2-1) the split structure of the current block is dual tree chroma and a product of a width and height of a chroma block is equal to or less than 16

(Condition 2-2) the split structure of the current block is dual tree chroma and a prediction mode type of the current block is MODE_TYPE_INTRA Alternatively, when any one of the following conditions 3-1 to 3-2 is satisfied, ternary splitting for a current block may be limited.

(Condition 3-1) the split structure of the current block is dual tree chroma and a product of a width and height of a chroma block is equal to or less than 32

(Condition 3-2) the split structure of the current block is dual tree chroma and a prediction mode type of the current block is MODE_TYPE_INTRA Switching from Single Tree Structure to Dual Tree Structure In a single tree structure, a luma block and a chroma block corresponding to the luma block may be split in the same manner. For example, when the luma block is vertical-ternary-split, the chroma block corresponding to the luma block may also be vertical-ternary-split. In this case, whether to split a CU may be determined based on a size of the luma block included in the CU. In addition, the size of the chroma block corresponding to the luma block may be determined based on the size of the luma block and the color format as described above with reference to Table 2.

Figure 9:
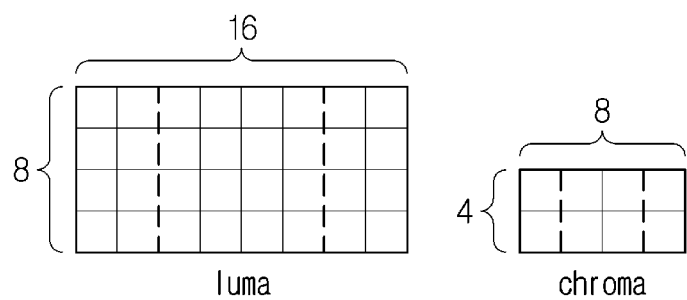
FIG. 9 is a view illustrating an example of a luma block and a chroma block in a 4:2:0 color format.

FIG. 9 is a view illustrating an example of a luma block and a chroma block in a 4:2:0 color format. FIGS. 10A to 10C are views illustrating an example of syntax for switching a current CTU to a local dual tree.

First, referring to FIG. 9, when the size of the luma block is 16×8 in the 4:2:0 color format, the size of the chroma block corresponding to the luma block may be determined to be 8×4. In this case, when an 8×4 chroma block is vertical-ternary-split, a 2×4 chroma block may be generated. When the chroma block is limited to include at least 16 chroma samples, the 2×4 chroma block cannot satisfy the minimum size limit. Accordingly, in the 4:2:0 color format, additional splitting of the 8×4 chroma block may be prohibited.

Even when additional splitting of the chroma block is prohibited, additional splitting of the luma block may be allowed. Accordingly, when additional splitting is performed only with respect to the luma block, the luma block and the chroma block which have been split to have a single tree structure within the current CTU may be switched to a dual tree structure. In this case, the split structure of the luma block and the chroma block split to have a dual tree structure may be referred to as a local dual tree structure.

FIGS. 10A to 10C are views illustrating an example of syntax for switching a single tree structure to a dual tree structure. FIGS. 10A to 10C illustrate syntax of one coding_tree, which is divided into three drawings for convenience.

Referring to FIGS. 10A to 10C, a prediction mode type of each of CUs generated from the current CTU may be determined based on a modeTypeCondition parameter in the coding_tree syntax. Here, modeTypeCondition may specify the prediction mode characteristics of each of the CUs. In addition, modeType may specify the prediction mode type of each of the CUs. In an example, modeType may have a value of any one of MODE_TYPE_ALL specifying that all prediction modes such as intra prediction, IBC, palette mode, inter prediction, etc. are available, MODE_TYPE_INTRA specifying that only intra prediction, IBC and palette modes are available, and MODE_TYPE_INTER specifying that only an inter prediction mode is available.

modeTypeCondition of the current CU may have any one of a first value (e.g., 0) to a third value (e.g., 2) according to a predetermined condition.

Specifically, when at least one of the following conditions 4-1 to 4-4 is satisfied, modeTypeCondition may have a first value (e.g. 0).

(Condition 4-1) the current CU is included in an I slice, a CTU included in the corresponding slice is implicit-quadtree-split into 64×64 luma sample CUs and the 64×64 CU is a root node of a dual tree (condition 4-2) modeTypeCurr is not MODE_TYPE_ALL (Condition 4-3) the color format (chroma format) of the current block is monochrome (Condition 4-4) the color format of the current block is a 4:4:4 format When all the above-described conditions are not satisfied and at least one of the following conditions 5-1 to 5-3 is satisfied, modeTypeCondition may have a second value (e.g., 1). In conditions 5-1 to 5-3, the current CU may mean a luma component block of the current CU.

(Condition 5-1) a product of the width and height of the current CU is 64 and the current CU is quadtree-split (Condition 5-2) a product of the width and height of the current CU is 64 and the current CU is horizontal-ternary-split or vertical-ternary-split (Condition 5-3) a product of the width and height of the current CU is 32 and the current CU is horizontal-binary-split or vertical-binary-split When all the above-described conditions are not satisfied and at least one of the following conditions 6-1 to 6-4 is satisfied, modeTypeCondition may have a second value (e.g., 1) or a third value (e.g., 2) depending on whether the current CU is included in the I slice. For example, as the case where at least one of the conditions 6-1 to 6-4 is satisfied, when the current CU is included in the I slice, modeTypeCondition may have a second value and, when the current CU is not included in the I slice, modeTypeCondition may have a third value. In the conditions 6-1 to 6-4, the current CU may mean the luma component block of the current CU.

(Condition 6-1) a product of the width and height of the current CU is 64, the current CU is horizontal-binary-split or vertical-binary-split and the color format of the current CU is a 4:2:0 format (Condition 6-2) a product of the width and height of a luma block included in the current CU is 128, the current CU is horizontal-ternary-split or vertical-ternary-split and the color format of the current CU is a 4:2:0 format (Condition 6-3) the width of the current CU is 8 and the current CU is horizontal-binary-split (Condition 6-4) the width of the current CTU is 16 and the current CU is vertical-ternary-split When all the above-conditions are satisfied, modeTypeCondition may have a first value (e.g., 0).

In addition, based on the value of modeTypeCondition, the modeType of the current CU may be determined.

Specifically, referring to FIG. 10A, when modeTypeCondition has a second value (e.g., 1) (1010), modeType may be determined to be MODE_TYPE_INTRA (1020).

Alternatively, when modeTypeCondition has a third value (e.g., 2) (1030), modeType may be determined based on the value of mode_constraint_flag. Here, mode_constraint_flag may specify whether an inter prediction mode applies to the current CU. For example, a first value (e.g., 0) of mode_constraint_flag may specify that only an inter prediction mode may apply for the current CU. In addition, in this case, modeType of the current CU may be determined to be MODE_TYPE_INTER. In contrast, a second value (e.g., 1) of mode_constraint_flag may specify that an inter prediction mode may not apply for the current CU. In addition, in this case, modeType may be determined to be MODE_TYPE_INTRA (1040).

Alternatively, when modeTypeCondition has a value other than the second value (e.g., 1) and the third value (e.g., 2) (for example, when modeTypeCondition has the first value (e.g., 0)), modeType may be determined to be the same value as modeTypeCurr (1050). Here, modeTypeCurr is a call input value of the coding_tree syntax, and may mean the prediction mode type of the current CU. In an example, when the current CU is a root node of a split tree, modeTypeCurr may be MODE_TYPE_ALL.

modeType determined based on the value of modeTypeCondition may be used as a call input value of the coding_tree syntax for calling a lower-layer CU obtained by splitting the current CU.

In addition, based on the value of modeType of the current CU, the split structure treeType of the lower-layer CU generated by splitting the current CU may be determined (1060). For example, when modeType of the current CU is MODE_TYPE_INTRA, the split structure of the lower-layer CU may be determined to be dual tree luma DUAL_TREE_LUMA. In contrast, when modeType is not MODE_TYPE_INTRA, the split structure of the lower-layer CU may be the split structure treeTypeCurr of the current CU.

Information on the split structure of the lower-layer CU may be stored in a parameter treeType. treeType and modeType may be used as an input value of the coding_tree syntax for calling lower-layer CUs by additionally splitting the current CU.

When modeType of the lower-layer CU is MODE_TYPE_INTRA, the current CU may be additionally split to have a dual tree structure. Specifically, referring to FIG. 10B, when modeType of the lower-layer CU is MODE_TYPE_INTRA, the lower-layer CU may have a tree structure of dual tree luma DUAL_TREE_LUMA. That is, the luma component and chroma component of the current CU may be split to have separate tree structures. (1070). In addition, referring to FIG. 10C, when modeTypeCurr of the current CU is MODE_TYPE_ALL and modeType of the lower-layer CU is MODE_TYPE_INTRA, the chroma component of the current CU is not split and the lower-layer CU may have a tree structure of dual tree chroma DUAL_TREE_CHROMA (1080).

As such, modeType of the lower-layer CU may be determined based on modeTypeCondition. In addition, when modeType of the lower-layer CU is MODE_TYPE_INTRA, the luma component of the lower-layer CU has a tree structure of dual tree luma and the chroma component of the lower-layer CU may have a tree structure of dual tree chroma. That is, the lower-layer CU partially has a dual tree structure within the current CTU, and such a split structure may be referred to as a local dual tree structure.

Hereinafter, an intra prediction mode and intra prediction of a chroma block will be described.

Overview of Intra Prediction

Intra prediction may indicate prediction which generates prediction samples for a current block based on reference samples in a picture to which the current block belongs (hereinafter referred to as a current picture). When intra prediction applies to the current block, neighboring reference samples to be used for intra prediction of the current block may be derived. The neighboring reference samples of the current block may include a sample adjacent to a left boundary of the current block having a size of nW×nH and a total of 2×nH samples adjacent to the bottom-left, a sample adjacent to a top boundary of the current block and a total of 2×nW samples adjacent to the top-right, and one sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block, and one sample adjacent to the bottom-right of the current block.

Some of the neighboring reference samples of the current block have not yet been decoded or may not be available. In this case, a decoder may construct neighboring reference samples to be used for prediction, by substituting unavailable samples with available samples. Alternatively, neighboring reference samples to be used for prediction may be constructed using interpolation of available samples.

When the neighboring reference samples are derived, (i) a prediction sample may be derived based on average or interpolation of neighboring reference samples of the current block and (ii) the prediction sample may be derived based on a reference sample present in a specific (prediction) direction with respect to the prediction sample among the neighboring reference samples of the current block. The case of (i) may be referred to as a non-directional mode or a non-angular mode and the case of (ii) may be referred to as a directional mode or an angular mode.

In addition, the prediction sample may be generated through interpolation with a first neighboring sample located in a prediction direction of the intra prediction mode of the current block and a second neighboring sample located in the opposite direction based on a prediction target sample of the current block among the neighboring reference samples. The above-described case may be referred to as linear interpolation intra prediction (LIP).

In addition, chroma prediction samples may be generated based on luma samples using a linear model. This case may be called a linear model (LM) mode.

In addition, a temporary prediction sample of the current block may be derived based on filtered neighboring reference samples, and the prediction sample of the current block may be derived by weighted-summing the temporary prediction sample and at least one reference sample derived according to the intra prediction mode among the existing neighboring reference samples, that is, the unfiltered neighboring reference samples. This case may be referred to as position dependent intra prediction (PDPC).

In addition, a reference sample line with highest prediction accuracy may be selected from multiple neighboring reference sample lines of the current block to derive a prediction sample using a reference sample located in a prediction direction in the corresponding line, and, at this time, information (e.g., intra_luma_ref_idx) on the used reference sample line may be encoded and signaled in a bitstream. This case may be referred to as multi-reference line (MRL) intra prediction or MRL based intra prediction.

In addition, the current block may be split into vertical or horizontal sub-partitions to perform intra prediction with respect to each sub-partition based on the same intra prediction mode. At this time, neighboring reference samples of intra prediction may be derived in units of sub-partitions. That is, a reconstructed sample of a previous sub-partition in encoding/decoding order may be used as a neighboring reference sample of a current sub-partition. In this case, the intra prediction mode for the current block equally applies to the sub-partitions and the neighboring reference samples are derived and used in units of sub-partitions, thereby increasing intra prediction performance Such a prediction method may be referred to as intra sub-partitions (ISP) or ISP based intra prediction.

The intra prediction technique may be referred to as various terms such as intra prediction type or additional intra prediction mode to be distinguished from a directional or non-directional intra prediction mode. For example, the intra prediction technique (intra prediction type or the additional intra prediction mode) may include at least one of LIP, LM, PDPC, MRL, ISP or MIP. Meanwhile, if necessary, post-filtering may be performed with respect to the derived prediction sample.

Specifically, the intra prediction procedure may include an intra prediction mode/type determination step, a neighboring reference sample derivation step and an intra prediction mode/type based prediction sample derivation step. In addition, if necessary, post-filtering may be performed with respect to the derived prediction sample.

Figure 11:
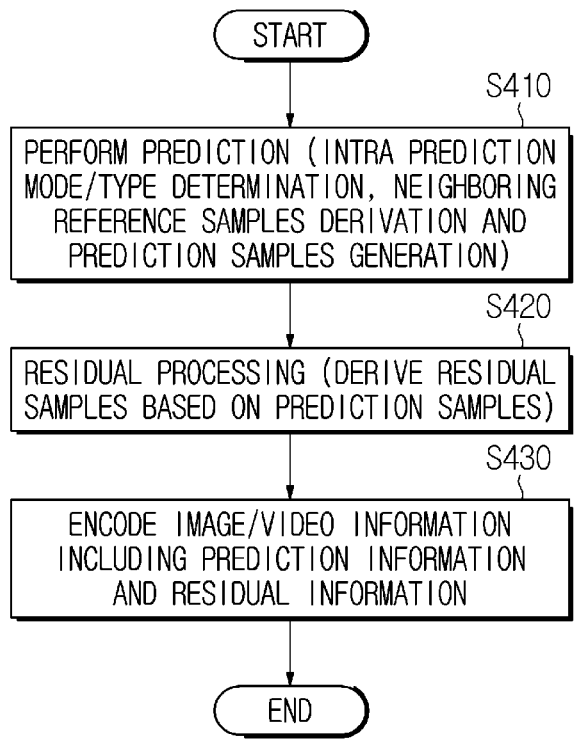
FIG. 11 is a flowchart illustrating an intra prediction based video/image encoding method.

FIG. 11 is a flowchart illustrating an intra prediction based video/image encoding method.

The encoding method of FIG. 11 may be performed by the image encoding apparatus of FIG. 2. Specifically, step S1110 may be performed by the intra predictor 185, and step S1120 may be performed by the residual processor. Specifically, step S1120 may be performed by the subtractor 115. Step S1130 may be performed by the entropy encoder 190. The prediction information of step S1130 may be derived by the intra predictor 185, and the residual information of step S1130 may be derived by the residual processor. The residual information is information on the residual samples. The residual information may include information on quantized transform coefficient for the residual samples. As described above, the residual samples may be derived as transform coefficient through the transformer 120 of the image encoding apparatus, and the transform coefficient may be derived as the transform coefficients quantized through the quantizer 130. The information on the quantized transform coefficients may be encoded by the entropy encoder 190 through a residual coding procedure.

The image encoding apparatus may perform intra prediction with respect to a current block (S1110). The image encoding apparatus may determine an intra prediction mode/type for the current block, derive neighboring reference samples of the current block, and generate prediction samples in the current block based on the intra prediction mode/type and the neighboring reference samples. Here, the intra prediction mode/type determination, neighboring reference samples derivation and prediction samples generation procedures may be simultaneously performed or any one procedure may be performed before the other procedures.

Figure 12:
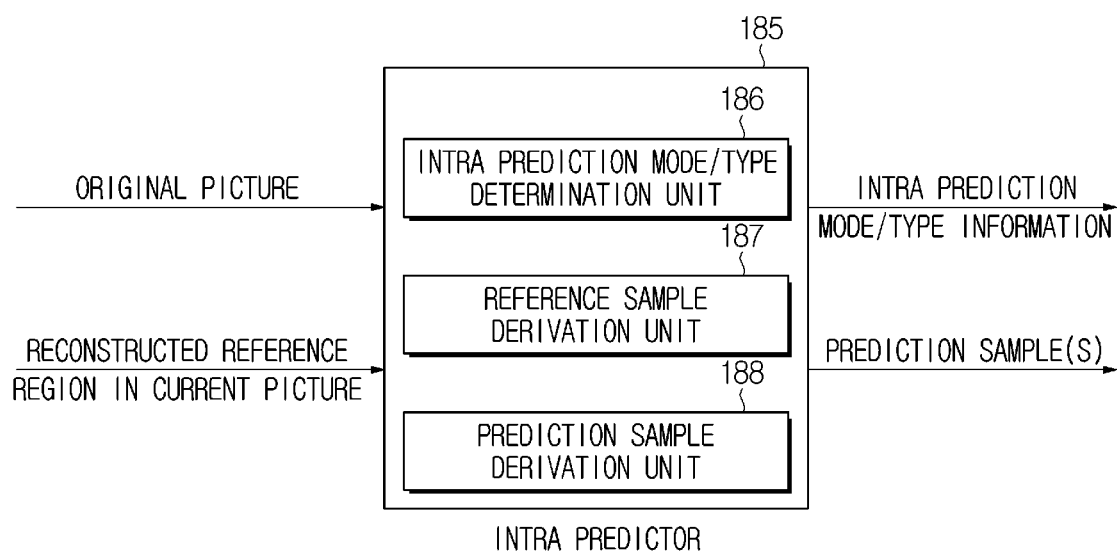
FIG. 12 is a view illustrating the configuration of an intra predictor according to the present disclosure.

FIG. 12 is a view illustrating the configuration of an intra predictor according to the present disclosure.

As shown in FIG. 12, the intra predictor 185 of the image encoding apparatus may include an intra prediction mode/type determination unit 186, a reference sample derivation unit 187 and/or a prediction sample derivation unit 188. The intra prediction mode/type determination unit 186 may determine an intra prediction mode/type for the current block. The reference sample derivation unit 187 may derive neighboring reference samples of the current block. The prediction sample derivation unit 188 may derive prediction samples of the current block. Meanwhile, although not shown, when the below-described prediction sample filtering procedure is performed, the intra predictor 185 may further include a prediction sample filter (not shown).

The image encoding apparatus may determine a mode/type applying for the current block among a plurality of intra prediction modes/types. The image encoding apparatus may compare rate distortion (RD) cost for the intra prediction modes/types and determine an optimal intra prediction mode/type for the current block.

Meanwhile, the image encoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

Referring to FIG. 11 again, the image encoding apparatus may generate residual samples for the current block based on the prediction samples or the filtered prediction samples (S1120). The image encoding apparatus may derive the residual samples by subtracting the prediction samples from the original samples of the current block. That is, the image encoding apparatus may derive the residual sample values by subtracting the corresponding prediction sample value from the original sample value.

The image encoding apparatus may encode image information including information on the intra prediction (prediction information) and residual information of the residual samples (1130). The prediction information may include the intra prediction mode information and/or the intra prediction technique information. The image encoding apparatus may output the encoded image information in the form of a bitstream. The output bitstream may be transmitted to the image decoding apparatus through a storage medium or a network.

The residual information may include residual coding syntax, which will be described later. The image encoding apparatus may transform/quantize the residual samples and derive quantized transform coefficients. The residual information may include information on the quantized transform coefficients.

Meanwhile, as described above, the image encoding apparatus may generate a reconstructed picture (including reconstructed samples and a reconstructed block). To this end, the image encoding apparatus may perform dequantization/inverse transform with respect to the quantized transform coefficients and derive (modified) residual samples. The reason for transforming/quantizing the residual samples and then performing dequantization/inverse transform is to derive the same residual samples as residual samples derived by the image decoding apparatus. The image encoding apparatus may generate a reconstructed bock including reconstructed samples for the current block based on the prediction samples and the (modified) residual samples. Based on the reconstructed block, the reconstructed picture for the current picture may be generated. As described above, an in-loop filtering procedure is further applicable to the reconstructed picture.

Figure 13:
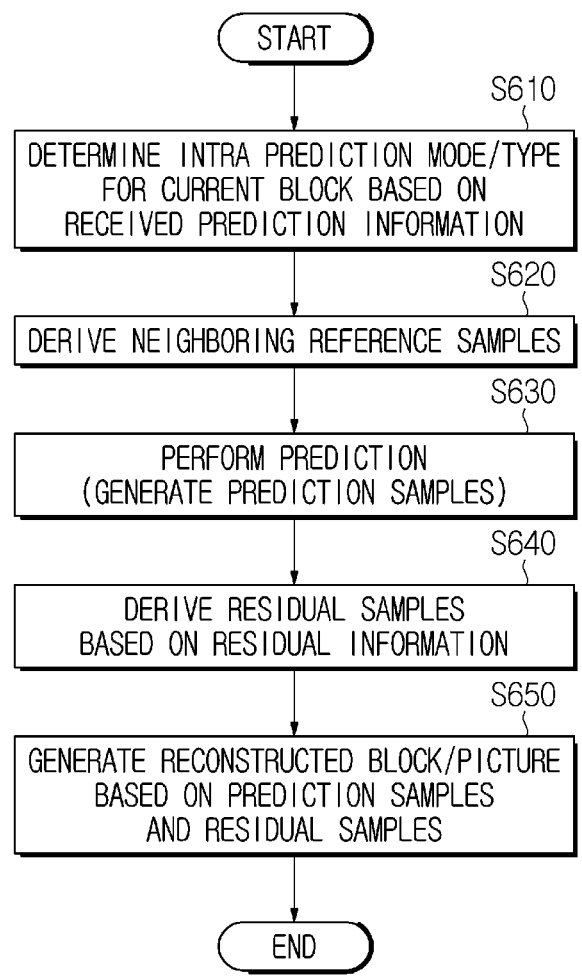
FIG. 13 is a flowchart illustrating an intra prediction based video/image decoding method.

FIG. 13 is a flowchart illustrating an intra prediction based video/image decoding method.

The image decoding apparatus may perform operation corresponding to operation performed by the image encoding apparatus.

The decoding method of FIG. 13 may be performed by the image decoding apparatus of FIG. 3. Steps S1310 to S1330 may be performed by the intra predictor 265, and the prediction information of step S1310 and the residual information of step S1340 may be obtained from a bitstream by the entropy decoder 210. The residual processor of the image decoding apparatus may derive residual samples for the current block based on the residual information (S1340). Specifically, the dequantizer 220 of the residual processor may perform dequantization based on the dequantized transform coefficients derived based on the residual information to derive transform coefficients, and the inverse transformer 230 of the residual processor may perform inverse transform with respect to the transform coefficients to derive the residual samples for the current block. Step S650 may be performed by the adder 235 or the reconstructor.

Specifically, the image decoding apparatus may derive an intra prediction mode/type for the current block based on the received prediction information (intra prediction mode/type information) (S1310). The image decoding apparatus may derive neighboring reference samples of the current block (S1320). The image decoding apparatus may generate prediction samples in the current block based on the intra prediction mode/type and the neighboring reference samples (S1330). In this case, the image decoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

The image decoding apparatus may generate residual samples for the current block based on the received residual information (S1340). The image decoding apparatus may generate reconstructed samples for the current block based on the prediction samples and the residual samples and derive a reconstructed block including the reconstructed samples (S1350). Based on the reconstructed block, the reconstructed picture for the current picture may be generated. An in-loop filtering procedure is further applicable to the reconstructed picture, as described above.

Figure 14:
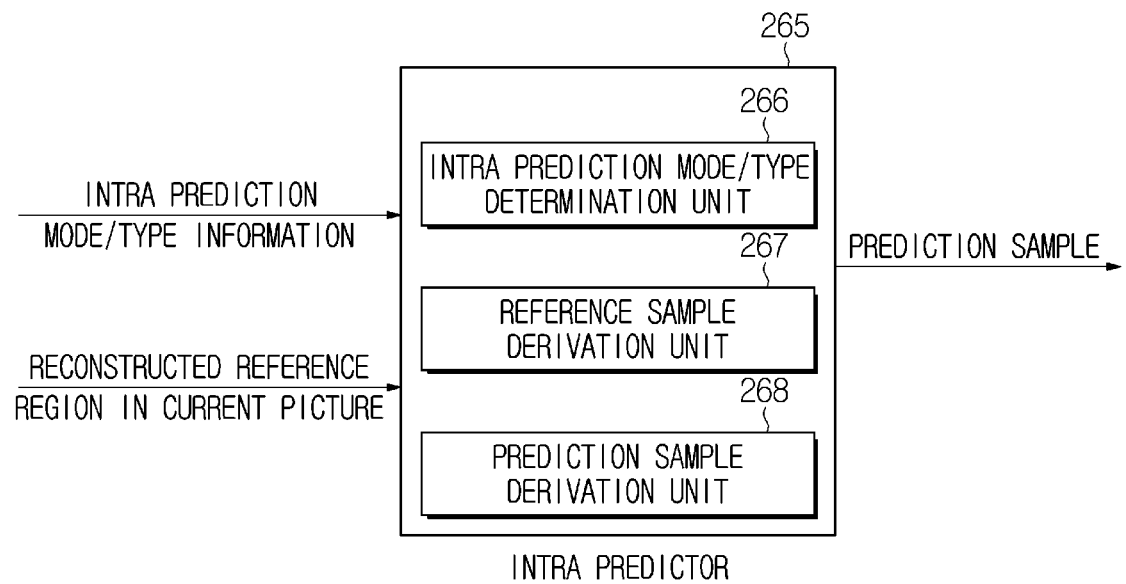
FIG. 14 is a view illustrating the configuration of an intra predictor according to the present disclosure.

FIG. 14 is a view illustrating the configuration of an intra predictor 265 according to the present disclosure.

As shown in FIG. 14, the intra predictor 265 of the image decoding apparatus may include an intra prediction mode/type determination unit 266, a reference sample derivation unit 267 and a prediction sample derivation unit 268. The intra prediction mode/type determination unit 266 may determine an intra prediction mode/type for the current block based on the intra prediction mode/type information generated and signaled by the intra prediction mode/type determination unit 186 of the image encoding apparatus, and the reference sample derivation unit 267 may derive neighboring reference samples of the current block from a reconstructed reference region in a current picture. The prediction sample derivation unit 268 may derive prediction samples of the current block. Meanwhile, although not shown, when the above-described prediction sample filtering procedure is performed, the intra predictor 265 may further include a prediction sample filter (not shown).

The intra prediction mode information may include, for example, flag information (e.g., intra_luma_mpm_flag and/or intra_chroma_mpm_flag) indicating whether to apply a most probable mode (MPM) or a remaining mode to the current block, and, when the MPM applies to the current block, the intra prediction mode information may further include index information (e.g., intra_luma_mpm_idx and/or intra_chroma_mpm_idx) indicating one of the intra prediction mode candidates (MPM candidates). The intra prediction mode candidates (MPM candidates) may be composed of an MPM candidate list or an MPM list. In addition, when the MPM does not apply for the current block, the intra prediction mode information may further include remaining mode information (e.g., intra_luma_mpm_remainder and/or intra_chroma_mpm_remainder) indicating one of the remaining intra prediction modes excluding the intra prediction mode candidates (MPM candidates). The image decoding apparatus may determine the intra prediction mode of the current block based on the intra prediction mode information. The MPM candidate modes may include the intra prediction modes of the neighboring blocks (e.g., the left neighboring block and/or the upper neighboring block) of the current block and additional candidate modes.

In an example, the intra prediction mode may include two non-directional intra prediction modes and 33 directional intra prediction modes. The non-directional intra prediction modes may include a planar mode and a DC mode, and the directional intra prediction modes may include intra prediction modes 2 to 34. The planar intra prediction mode may be referred to as a planar mode and the DC intra prediction mode may be referred to as a DC mode.

Alternatively, in order to capture any edge direction presented in natural video, the intra prediction mode may include two non-directional intra prediction modes and 65 extended directional intra prediction modes. The non-directional intra prediction modes may include a planar mode and a DC mode, and the extended directional intra prediction modes may include intra prediction modes #2 to #66. The intra prediction mode may apply for blocks having all sizes and to both a luma component (luma block) and a chroma component (chroma block).

Alternatively, the intra prediction mode may include two non-directional intra prediction modes and 129 directional intra prediction modes. The non-directional intra prediction modes may include a planar mode and a DC mode, and the directional intra prediction modes may include intra prediction modes #2 to #130.

Meanwhile, the intra prediction mode may further include a cross-component linear model (CCLM) mode for chroma samples in addition to the above-described intra prediction modes. The CCLM mode may be split into L_CCLM, T_CCLM, LT_CCLM according to whether left samples, top samples or both thereof is considered for LM parameter derivation and may apply only to a chroma component.

In another example, in order to capture any edge direction presented in natural video, the intra prediction mode may include two non-directional intra prediction modes and 93 directional intra prediction modes. The non-directional intra prediction modes may include a planar mode and a DC mode. The planar mode may be denoted by INTRA_PLANAR, and the DC mode may be denoted by INTRA_DC. In addition, the directional intra prediction mode may be denoted by INTRA_ANGULAR-14 to INTRA_ANGULAR-1 and INTRA_ANGULAR2 to INTRA_ANGULAR80.

In addition, the intra prediction technique information may be implemented in various forms. For example, the intra prediction technique information may include intra prediction type index information specifying one of a plurality of intra prediction techniques. As another example, the intra prediction technique information may include at least one of reference sample line information (e.g., intra_luma_ref_idx) indicating whether to apply MRL to the current block and, if applied, which reference sample line is used, ISP flag information (e.g., intra_subpartitions_mode_flag) indicating whether to apply ISP to the current block, ISP type information (e.g., intra_subpartitions_split_flag) specifying the split type of sub-partitions when applying ISP, flag information specifying whether to apply PDPC, or flag information specifying whether to apply LIP. In the present disclosure, ISP flag information may be referred to as an ISP application indicator.

The intra prediction mode information and/or the intra prediction technique information may be encoded/decoded through the coding method described in the present disclosure. For example, the intra prediction mode information and/or the intra prediction technique information may be encoded/decoded through entropy coding (e.g., CABAC, CAVLC) based on a truncated (rice) binary code.

Intra Prediction of Chroma Block

When intra prediction is performed on a current block, prediction on a luma component block (luma block) and chroma component block (chroma block) of the current block may be performed, and, in this case, the intra prediction mode for the chroma block may be set separately from the intra prediction mode for the luma block.

For example, the intra prediction mode for the chroma block may be specified based on intra chroma prediction mode information, and the intra chroma prediction mode information may be signaled in the form of an intra_chroma_pred_mode syntax element. For example, the intra chroma prediction mode information may specify one of a planar mode, a DC mode, a vertical mode, a horizontal mode, a derived mode (DM) and a cross-component linear model (CCLM) mode. Here, the planar mode may specify intra prediction mode #0, the DC mode may specify intra prediction mode #1, the vertical mode may specify intra prediction mode #26, and the horizontal mode may specify intra prediction mode #10. DM may also be referred to as a direct mode. The CCLM may also be referred to as a linear model (LM).

The DM and the CCLM are dependent intra prediction modes for predicting the chroma block using information on the luma block. The DM may mean a mode in which the same intra prediction mode as the intra prediction mode for the luma component applies as the intra prediction mode for the chroma component. In addition, the CCLM may mean an intra prediction mode using, as the prediction samples of the chroma block, samples derived as shown in Equation 1 by subsampling reconstructed samples of the luma block and then applying CCLM parameters α and β to subsampled samples, in a process of generating the prediction block for the chroma block.

$$pred_c(i, j) = \alpha \cdot rec'_L(i, j) + \beta \quad \text{[Equation 1]}$$

where, $pred_c(i,j)$ may denote the prediction sample of (i, j) coordinates of the current chroma block in the current CU. $rec_L'(i,j)$ may denote the reconstructed sample of (i, j) coordinates of the current luma block in the CU. For example, $rec_L'(i,j)$ may denote the down-sampled reconstructed sample of the current luma block. Linear model coefficients α and β may be signaled or derived from neighboring samples.

When the chroma block is predicted in the DM, the intra prediction mode of the chroma block may be derived as the intra prediction mode of the corresponding luma block. For example, the intra prediction mode at a predetermined position of the corresponding luma block may be used as the intra prediction mode of the chroma block.

Meanwhile, intra prediction of the chroma block may be performed using multiple DM (multiple direct modes (MDM)). Multiple DM is used by extending a single DM to multiple modes, a DM candidate list including a plurality of DM candidates may be constructed to derive an intra prediction mode of the chroma block, and one of candidates included in the DM candidate list may be derived as the intra prediction mode of the chroma block. when applying the multiple DM, the DM candidate list may include at least one of the following multiple DM candidates.

- intra prediction mode of at CR, TL, TR, BL and BR positions of the corresponding luma block
- intra prediction mode at L, A, BL, AR and AL positions which are the neighboring blocks of the chroma block
- planar mode and DC mode
- directional mode derived by adding/subtracting a predetermined offset (e.g., 1) to/from an already included directional mode
- default DM candidate mode: vertical mode, horizontal mode, Mode #2, #34, #66, #10, #26 (in case of 65 directional modes)
- when four default DM candidates (PLANAR mode, DC mode, vertical mode and horizontal mode) are not included in the DM candidate list, the DM candidate already included in the list is replaced with the default DM candidate which is not included The intra prediction mode of the chroma block may be derived based on intra chroma prediction mode information intra_chroma_pred_mode and/or the intra prediction mode of the corresponding luma block. For example, when the intra chroma prediction mode information specifies a DM, the intra prediction mode of the chroma block may be determined in the same manner as the intra prediction mode of the corresponding luma block.

According to the above-described intra prediction method, intra prediction for the luma block may be performed based on an MPM list, and intra prediction for the chroma block may be performed based on a predetermined default mode and/or DM. The default intra prediction mode may include a planar mode, a DC mode, a vertical mode and a horizontal mode.

Hereinafter, a palette mode will be described.

Overview of Palette Mode

A palette mode may mean a prediction mode in which a current block is encoded/decoded based on a palette (or palette table) including a predetermined representative color value set. In the palette mode, each sample in the current block may be represented as a palette index specifying a predetermined representative color value. In the present disclosure, encoding/decoding using a palette mode may be referred to as palette encoding/decoding.

The palette mode may be used to improve encoding/decoding efficiency of a specific image. For example, screen content, which is an image including a significant amount of text and graphics generated by an electronic apparatus such as a computer or a smartphone, includes a local area separated by a sharp edge, and the local area may be represented with a relatively small number of colors. Accordingly, the palette mode in which most pixel values in the current block is represented with a relatively small number indices may be more effective in encoding/decoding of screen content compared to other prediction modes (e.g., intra prediction mode, inter prediction mode, etc.)

The palette mode is one of the above-described intra prediction modes and may be called a palette encoding mode, an intra palette mode, an intra palette encoding mode, etc. However, when the palette mode applies to the current block, unlike the intra prediction mode, a residual value for the current block may not be separately signaled. In this regard, the palette mode may be similar to the above-described skip mode.

When the current block has a single tree structure, the palette mode may apply for both the luma component and chroma component of the current block. For example, when the palette mode applies to the luma component of the current block having the single tree structure, the palette mode may apply for the chroma component of the current block. In contrast, when the current block has a dual tree structure, the palette mode may individually apply for the luma component and chroma component of the current block. For example, when the palette mode applies to the luma component of the current block having the dual tree structure, the palette mode may apply for the chroma component of the current block or one of other prediction modes (e.g., intra prediction mode, inter prediction mode, etc.) may apply.

When the palette mode applies to the current block, a palette table for the current block may be constructed based on a palette predictor.

The palette predictor may include one or more palette entries (representative color values) and one or more palette indices for identifying the palette entries. In an example, the palette predictor may be initialized to a predetermined value (e.g., 0) at the first encoding/decoding time of a CTU (or slice) including the current block. In addition, the palette predictor may be updated using at least one palette entry used for palette encoding/decoding. In an embodiment, until the size of the palette predictor reaches a predetermined maximum size (that is, until the palette predictor includes a maximum allowed number of palette entries), a palette entry of a previous palette predictor which is not included in a current palette table may be added to a last position (index) of the palette predictor for next palette encoding. This may be referred to as palette stuffing.

The palette table may include at least one palette entry included in the palette predictor and at least one palette index for identifying the palette entry. For each palette entry included in the palette predictor, a reuse flag specifying whether the palette entry is included in the palette table may be signaled through a bitstream. In this case, the reuse flag having a first value (e.g., 0) may specify that the palette entry is not included in the palette table. In contrast, the reuse flag having a second value (e.g., 1) may specify that the corresponding palette entry is included in the palette table. The reuse flag may be encoded, for example, using run-length coding for a value of 0.

In addition, the palette table may include at least one new palette entry which is not included in the palette predictor and at least one palette index for identifying the new palette entry. Information (e.g., a total number, a component value, etc.) on the new palette entry may be encoded, for example, using a 0-th exponential Golomb code and signaled through a bitstream.

Based on the palette table, a palette index map for the current block to be encoded may be generated. Specifically, based on similarity between a pixel value of each of a plurality of samples in the current block and a representative color value, by mapping a predetermined palette index in the palette table to each of the plurality of samples, the palette index map for the current block may be generated. In this case, an escape palette index may be mapped to a sample (escape sample) having a pixel which is not similar to the representative color value (palette entry) defined in the palette table among the plurality of samples in the current block. The escape palette index may specify an escape sample (escape symbol) and may have the largest value within the palette table. In an example, whether the current block includes an escape sample may be signaled using an escape sample flag (e.g., palette_escape_val_present_flag). For example, palette_escape_val_present_flag having a first value (e.g., 0) may specify that the current block does not include the escape sample. In contrast, palette_escape_val_present_flag having a second value (e.g., 1) may specify that the current block includes the escape sample.

Palette index prediction information of the palette index map may be signaled through a bitstream. The palette index prediction information may include at least one palette index mapped to the current block and run-value information of the palette index. The run-value of the palette index may specify a value obtained by subtracting 1 from the number of palette indices continuously mapped to the current block as the same value. For example, when the current block includes first to fourth samples continuously present in a predetermined scan direction (e.g., horizontal direction), a first palette index (e.g., 0) is mapped to each of the first to third samples and a second palette index (e.g., 1) is mapped to the fourth sample, the run-value of the first palette index may be 2, and the run-value of the second palette index may be 0. When the current block includes the escape sample (escape symbol) (e.g., palette_escape_val_present_flag=1), the palette index prediction information may include run-value information of the escape palette index mapped to the escape sample.

Based on the palette index prediction information, a palette index map for the current block to be encoded may be generated. For example, by mapping each of one or more palette indices obtained from the palette index prediction information to each of the plurality of samples in the current block, the palette index map for the current block may be generated. In an example, based on a last palette index (in mapping order) among one or more palette indices obtained from the palette index prediction information, the value of each of the one or more palette indices may be adjusted. For example, when the last palette index obtained from the palette index prediction information is an escape palette index, palette entries obtained from the palette index prediction information may be mapped to the current block as a value increasing by a predetermined size (e.g., 1).

The current block may be encoded/decoded based on the palette index map. For a sample having a pixel value equal or similar to the representative color value defined in the palette table among the plurality of samples in the current block, the value of the palette index specifying the corresponding representative color value may be signaled through a bitstream. In contrast, for a sample having a pixel value which is not similar to the representative color value defined in the palette table among the plurality of samples in the current block, a quantized pixel value of the corresponding sample may be directly signaled through a bitstream.

In order to encode palette indices mapped to the current bock, the palette index map may be scanned using a predetermined scan method. In addition, in order to construct palette index map using the palette indices obtained from the bitstream, the current block may be scanned using the predetermined scan method.

Figure 15:
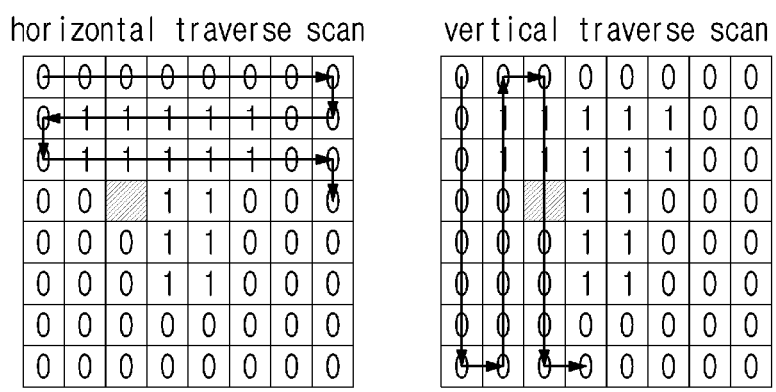
FIG. 15 is a view illustrating an example of a scan method which may be used in a palette mode.

FIG. 15 is a view illustrating an example of a scan method which may be used in a palette mode.

Referring to FIG. 15, the scan method which may be used in the palette mode may include horizontal traverse scan and vertical traverse scan. The horizontal traverse scan may mean a method in which an odd-numbered row of the current block (or palette index map) is scanned from left to right and an even-numbered row of the current block is scanned from right to left. In addition, the vertical traverse scan may mean a method in which an odd-numbered column of the current block is scanned from top to bottom and an even-numbered column of the current block is scanned from bottom to top.

Information on the scan method which may be used in the palette mode may be signaled using a predetermined flag (e.g., palette_transpose_flag). For example, when the horizontal traverse scan is used for palette encoding of the current block, palette_transpose_flag having a first value (e.g., 0) may be signaled through a bitstream. In contrast, when the vertical traverse scan is used for palette encoding of the current block, palette_transpose_flag having a second value (e.g., 1) may be signaled through a bitstream.

Palette indices mapped to each sample in the current block may be encoded using an 'INDEX' mode and a 'COPY_ABOVE' mode. In the present disclosure, the 'INDEX' mode and the 'COPY_ABOVE' mode may be referred to as a palette sample mode.

Except for the topmost row of the current block in the horizontal traverse scan, the leftmost column of the current block in the vertical traverse scan and the case where an immediately previous palette sample mode is 'COPY_ABOVE', information on the palette sample mode may be signaled using a predetermined flag (e.g., copy_above_palette_indices_flag). For example, copy_above_palette_indices_flag having a first value (e.g., 0) may specify that the predetermined palette index mapped to the current block is encoded using the 'INDEX' mode. In contrast, copy_above_palette_indices_flag having a second value (e.g., 1) may specify that the predetermined palette index mapped to the current block is encoded using the 'COPY_ABOVE' mode.

In the 'INDEX' mode, the value of the palette index may be explicitly signaled through a bitstream. In the 'INDEX' mode and the 'COPY_ABOVE' mode, run-value information specifying the number of samples continuously encoded using the same palette sample mode may be signaled through a bitstream.

The palette indices included in the palette index map may be encoded in the following order.

First, the number of palette indices mapped to the current block (or current CU) may be signaled. Next, the value of each of the palette indices may be signaled using fixed length coding. In an example, the number of palette indices and the value of each of palette indices may be encoded using a bypass mode. Through this, bypass bins related to the palette index may be grouped. In addition, information (e.g., copy_above_palette_indices_flag) on the palette sample mode and the run-value information of the palette sample mode may be signaled in an interleaving manner Finally, component escape values corresponding to the escape samples in the current block may be grouped and encoded in the bypass mode. In an example, after signaling the value of each of the palette indices, at least one additional syntax element (e.g., last_run_type_flag) may be additionally signaled. In this case, based on the number of palette indices and the additional syntax element, a signaling process of a run-value corresponding to last run in the current block may be skipped.

Figure 16:
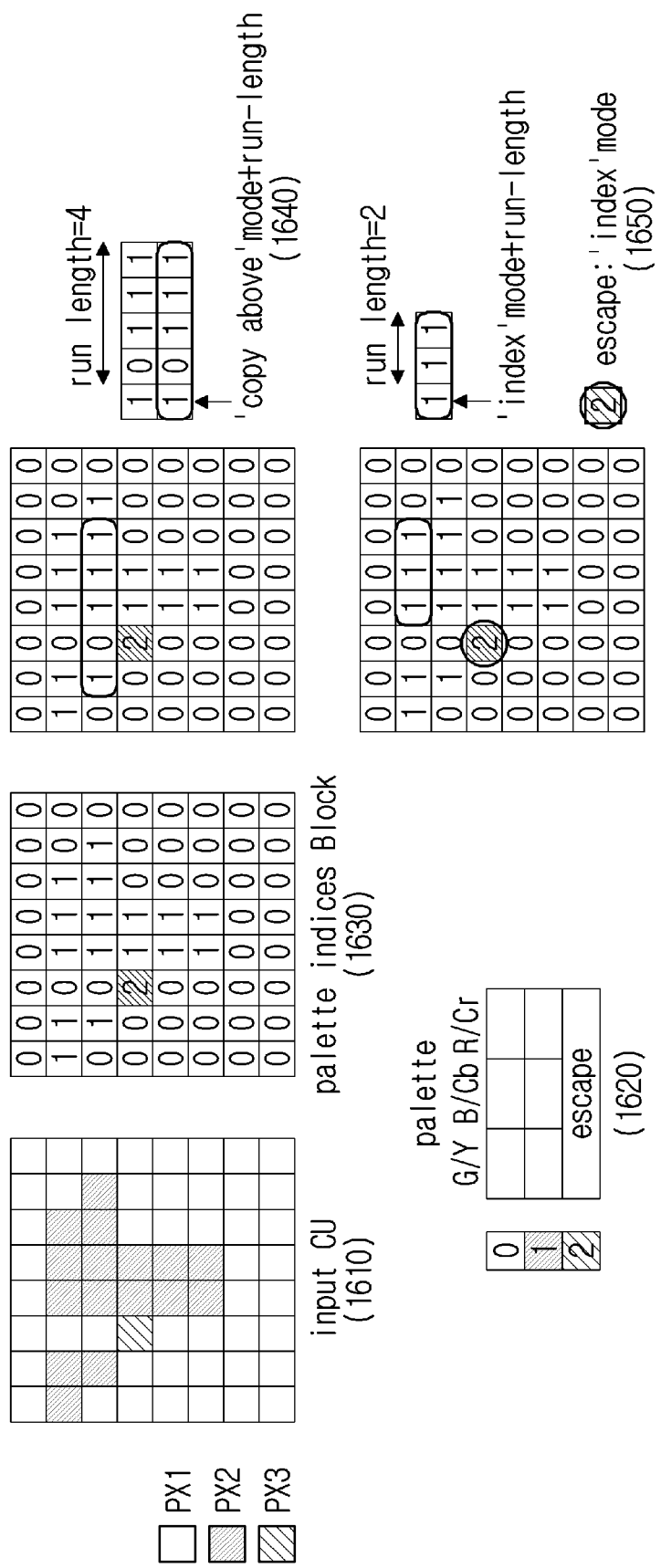
FIG. 16 is a view illustrating an example of a palette encoding process of a current block.

FIG. 16 is a view illustrating an example of a palette encoding process of a current block.

Referring to FIG. 16, a plurality of pixels (samples) in a current block may be represented using a total of three color values (1610). For example, first pixels PX1 may have a first color value, second pixels PX2 may have a second color value and third pixels PX3 may have a third color value.

When the palette mode applies to the current block, a palette table for the current block may be constructed (1620). The palette table may include palette entries (representative color value) for each color component (e.g., (G, B, R), (Y, Cb, Cr), etc.) and a palette index (e.g., 0, 1) for identifying each palette entry. In addition, the palette table may further include an escape palette index (e.g., 2). The escape palette index may be mapped to an escape sample (or escape symbol) having a pixel value which is not similar to the representative color value defined in the palette table among the plurality of pixels in the current block. For the escape sample to which the escape palette index is mapped, a quantized pixel value of the escape sample may be signaled.

Based on similarity between the pixel value of each of the plurality of samples in the current block and the representative color value, by mapping a predetermined palette index in the palette table to each of the plurality of samples, a palette index map for the current block may be generated (1630). For example, a first palette index (e.g., 0) may be mapped to each of first pixels PX1, a second palette index (e.g., 1) may be mapped to each of the second pixels PX2, and an escape palette index (e.g., 2) may be mapped to a third pixel PX3 which is an escape sample, thereby generating the palette index map for the current block.

In order to encode the palette index map, by scanning palette indices included in the palette index map according to a predetermined scan method, the palette sample mode of each of the plurality of samples in the current block and the run-value of the palette sample mode may be derived (1640, 1650). For example, in the horizontal traverse scan, palette indices '1, 0, 1, 1, 1' continuously mapped to a third row of the palette index map have the same index value as the palette indices present at the same position of a second row of the palette index map and thus may be encoded in the 'COPY_ABOVE' mode, and the run-value of the 'COPY_ABOVE' mode may be 4 (1640). In addition, in the horizontal traverse scan, palette indices '1, 1, 1' continuously mapped to a second row of the palette index map have an index value different from palette indices present at the same position of a first row of the palette index map and thus may be encoded in the 'INDEX' mode, and the run-value of the 'INDEX' mode may be 2 (1650). Meanwhile, an escape palette index (e.g., 2) mapped to a third pixel PX3 which is an escape sample may be encoded in the 'INDEX' mode.

When the palette mode applies to the current block, a predetermined palette index in the palette table may be mapped to each of the plurality of samples in the current block to generate a palette index map, and the palette index included in the palette index map may be encoded in the 'INDEX' mode or the COPY_ABOVE' mode according to a predetermined method.

Hereinafter, syntax elements for the palette mode will be described.

FIG. 17 is a view illustrating some of coding_unit syntax for a palette mode, and FIGS. 18A to 18E are views illustrating palette_coding syntax for a palette mode. The syntax element for the palette mode may be encoded as shown in FIGS. 17 and 18A to 18E and signaled through a bitstream.

First, referring to FIG. 17, a palette mode flag pred_mode_ plt_flag may specify whether the palette mode applies to the current block (or the current CU). For example, a first value (e.g., 0) of pred_mode_plt_flag may specify that the palette mode may not apply for the current block. In contrast, a second value (e.g., 1) of pred_mode_plt_flag may specify that the palette mode applies to the current block. When pred_mode_plt_flag is not obtained from the bitstream, the value of pred_mode_plt_flag may be determined to be a first value.

Referring to FIG. 18A, a parameter PredictorPaletteSize [startComp] may specify a size of a palette predictor for a first color component startComp of the palette table (current palette table) for the current block.

In addition, a parameter PalettePredictorEntryReuseFlags [i] may specify whether an i-th palette entry in the palette predictor is in the current palette table (that is, whether it is reused). For example, PalettePredictorEntryReuseFlags[i] having a first value (e.g., 0) may specify that the i-th palette entry in the palette predictor is not reused in the current palette table. In contrast, PalettePredictorEntryReuseFlags [i] having a second value (e.g., 1) may specify that the i-th palette entry in the palette predictor is reused in the current palette table. In an example, an initial value of PalettePredictorEntryReuseFlags[i] may be set to 0.

In addition, a parameter palette_predictor_run may specify the number of 0s present before a non-zero palette entry in a PalettePredictorEntryReuseFlags array.

In addition, a parameter num_signalled_palette_entries may specify the number of palette entries in the current palette table explicitly signaled for a first color component startComp of the current palette table. When num_signalled_ palette_entries is not obtained from the bitstream, the value of num_signalled_palette_entries may be inferred as 0.

Referring to FIG. 18B, a parameter CurrentPaletteSize [startComp] may specify a size of the current palette table for the first color component startComp of the current palette table. The value of CurrentPaletteSize[startComp] may be calculated as shown in Equation 2 below. In an example, CurrentPaletteSize[startComp] may have a value of 0 to palette_max_size.

$$CurrentPaletteSize[startComp] = \qquad \text{[Equation 2]}$$
$$NumPredictedPaletteEntries +$$
$$num\_signalled\_palette\_entries$$

In addition, a parameter new_palette_entries[cIdx][i] may specify a value of a new i-th palette entry signaled for a color component cIdx.

In addition, a parameter PredictorPaletteEntries[cIdx][i] may specify an i-th palette entry in the palette predictor for a color component cIdx.

In addition, a parameter CurrentPaletteEntries[cIdx][i] may specify an i-th palette entry in the current palette table for a color component cIdx.

In addition, a parameter palette_escape_val_present_flag may specify whether an escape sample (escape symbol) is present. For example, palette_escape_val_present_flag having a first value may specify that the current block does not include an escape sample. In contrast, palette_escape_val_present_flag having a second value (e.g., 1) may specify that the current block includes an escape sample. When palette_escape_val_present_flag is not obtained from the bitstream, the value of palette_escape_val_present_flag may be inferred as 1.

In addition, a parameter MaxPaletteIndex may specify a maximum value of the palette index in the current palette table. The value of MaxPaletteIndex may be calculated as shown in Equation 3 below.

$$MaxPaletteIndex = CurrentPaletteSize[startComp] + \qquad \text{[Equation 3]}$$
$$palette\_escape\_val\_present\_flag$$

In addition, a parameter num_palette_indices_minus1 may specify a value obtained from subtracting 1 from the number of palette indices signaled in the palette encoding process of the current block. When num_palette_indices_minus1 is not obtained from the bitstream, the value of num_palette_indices_minus1 may be inferred as 0.

In addition, a parameter palette_idx_idc may be an indicator a palette index for the current palette table CurrentPaletteEntries. palette_idx_idc may have a value of 0 to MaxPaletteIndex for a first palette index of the corresponding block, and have a value of 0 to MaxPaletteIndex−1 for the remaining palette indices of the corresponding block. When the value of palette_idx_idc is not obtained from the bitstream, the value of palette_idx_idc may be inferred as 0.

In addition, a parameter PaletteIndexIdc[i] may specify an i-th palette_idx_idc. In an example, all values of an array PaletteIndexIdc may be initialized to 0.

In addition, a parameter copy_above_indices_for_final_run_flag may specify a palette index at a last position in the current block is copied from a previous palette index. For example, copy_above_indices_for_final_run_flag having a first value (e.g., 0) may specify that the palette index at the last position in the current block is copied from PaletteIndexIdc[num_palette_indices_minus1]. In contrast, copy_above_indices_for_final_run_flag having a second value (e.g., 1) may specify that the palette index at the last position in the current block is copied from the palette index of a neighboring sample. When the vertical traverse scan is used, the neighboring sample may be present at the same position as the current sample in a left column of the current sample. When the horizontal traverse scan is used, the neighboring sample may be present at the same position as the current sample in an upper row of the current sample. When copy_above_indices_for_final_run_flag is not obtained from the bitstream, the value of copy_above_indices_for_final_run_flag may be inferred as 0.

In addition, a parameter palette_transpose_flag may specify a scan method of a current block (or palette index map). For example, palette_transpose_flag having a first value (e.g., 0) may specify that the horizontal traverse scan applies to the current block. In contrast, palette_transpose_flag having a second value (e.g., 1) may specify that the vertical traverse scan applies to the current block. When palette_transpose_flag is not obtained from the bitstream, the value of palette_transpose_flag may be inferred as 0.

Referring to FIG. 18C, a parameter copy_above_palette_indices_flag may specify an encoding mode (palette sample mode) for the current sample in the current block. For example, copy_above_palette_indices_flag having a first value (e.g., 0) may specify that the palette index mapped to the current sample is encoded in the 'INDEX' mode. In contrast, copy_above_palette_indices_flag having a second value (e.g., 1) may specify that the palette index mapped to the current sample is encoded in the 'COPY_ABOVE' mode.

In addition, a parameter CopyAboveIndicesFlag[xC][yC] may specify an encoding mode for each of the plurality of samples in the current block. That is, CopyAboveIndicesFlag may be an array of copy_above_palette_indices_flag for each of the plurality of samples in the current block. Here, xC and yC may be coordinate indicators specifying relative positions of the current block from the top-left sample of the current picture.

When CopyAboveIndicesFlag[xC][yC] has a first value (e.g., 0), PaletteRunMinus1 may specify a value obtained by subtracting 1 from the number of palette indices continuously encoded using the 'COPY_ABOVE'. In contrast, when CopyAboveIndicesFlag[xC][yC] has a second value (e.g., 1), PaletteRunMinus1 may specify a value obtained by subtracting 1 from the number of palette indices continuously encoded using the 'INDEX' mode.

Referring to FIG. 18D, a parameter PaletteIndexMap[xC][yC] may specify a palette index map for the current block. That is, PaletteIndexMap may be an array of CurrentPaletteEntries for each of the plurality of samples in the current block. Here, xC and yC may coordinate indicators specifying relative positions of the current sample of the top-left sample of the current picture. In an example, PaletteIndexMap[xC][yC] may have a value of 0 to (MaxPaletteIndex−1).

In addition, a parameter PaletteMaxRunMinus1 may specify a maximum value of PaletteRunMinus1. In an example, PaletteMaxRunMinus1 may have a value greater than 0.

In addition, a parameter palette_run_prefix may specify a prefix portion used for binarization of PaletteRunMinus1.

In addition, a parameter palette_run_suffix may specify a suffix portion used for binarization of PaletteRunMinus1. When palette_run_suffix is not obtained from the bitstream, the value of palette_run_suffix may be inferred as 0.

In an example, when the value of PaletteMaxRunMinus1 is 0, the value of PaletteRunMinus1 may be set to 0. In contrast, when PaletteMaxRunMinus1 is greater than 0, PaletteRunMinus1 may be set based on the value of palette_run_prefix. For example, when the value of palette_run_prefix is less than 2, the value of PaletteRunMinus1 may be set as shown in Equation 4 below.

$$PaletteRunMinus1 = \text{palette\_run\_prefix} \qquad \text{[Equation 4]}$$

When the value of palette_run_prefix is equal to or greater than 2, the value of PaletteRunMinus1 may be calculated as shown in Equation 5 below.

$$PrefixOffset = 1 \ll (\text{palette\_run\_prefix} - 1) \qquad \text{[Equation 5]}$$
$$PaletteRunMinus1 = PrefixOffset + \text{palete\_run\_suffix}$$

Referring to FIG. 18E, a parameter palette_escape_val may specify a quantized pixel value of an escape sample in the current block.

In addition, a parameter PaletteEscapeVal[cIdx][xC][yC] may specify a quantized pixel value of an escape sample in which the value of PaletteIndexMap[xC][yC] is MaxPaletteIndex and the value of palette_escape_val_present_flag is 1. Here, cIdx may specify a color component, and xC and yC may coordinate indicators specifying relative positions of the current sample from the top-left sample of the current picture.

Hereinafter, a method of applying a palette mode to a current block having a local dual tree structure will be described.

Application of Palette Mode to Current Block Having Local Dual Tree Structure

Figure 19:
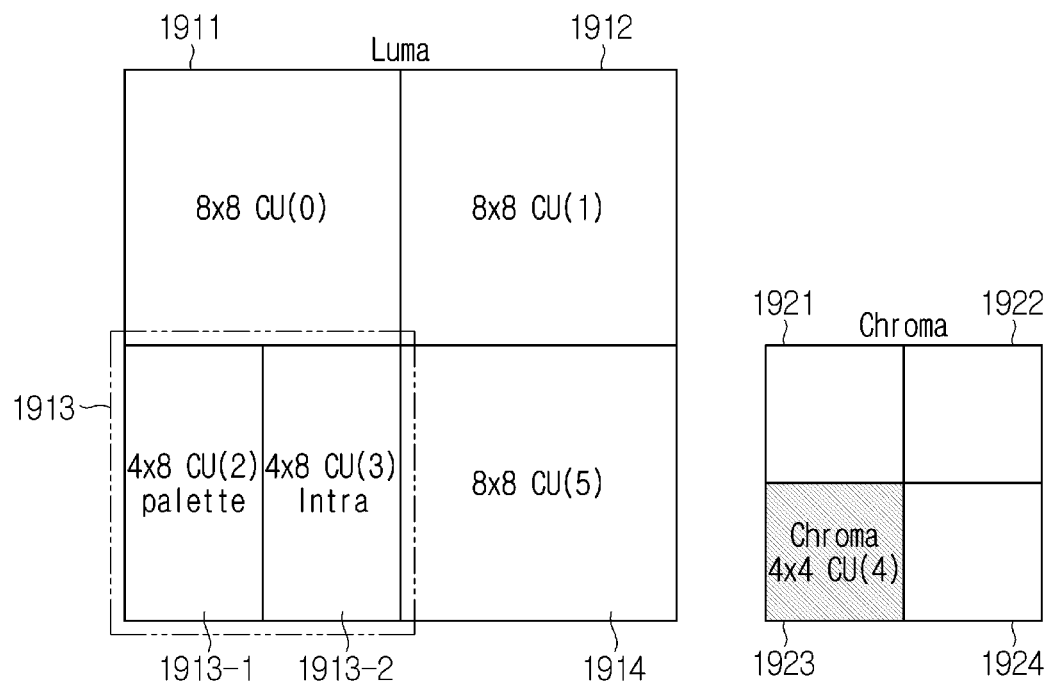
FIG. 19 is a view illustrating an example of a CTU having a local dual tree structure.

FIG. 19 is a view illustrating an example of a CTU having a local dual tree structure.

Referring to FIG. 19, a current CU may be split to have a quadtree structure for each of a luma component and a chroma component. For example, in the current CU having a 4:2:0 color format, a 16×16 luma block may be quadtree-split, thereby generating first to fourth luma blocks 1911 to 1914 each having a size of 8×8. In addition, an 8×8 chroma block may be quadtree-split, thereby generating first to fourth chroma blocks 1921 to 1924 each having a size of 4×4. In this case, the first chroma block 1921 may correspond to the first luma block 1911, the second chroma block 1922 may correspond to the second luma block 1912, the third chroma block 1923 may correspond to the third luma block 1913, and the fourth chroma block 1924 may correspond to the fourth luma block 1914.

When the minimum size of the chroma block is constrained to include 16 or more chroma samples, additional splitting of the first to fourth chroma blocks 1921 to 1924 may be prohibited. In contrast, in order to improve encoding efficiency, additional splitting of the first to fourth luma blocks 1911 to 1914 may be allowed. Accordingly, the third luma block 1913 may be vertical-binary-split, thereby generating two luma blocks 1913-1 and 1913-2 each having a size of 4×8. In this case, the split structure of the third luma block 1913 may be referred to as dual tree luma DUAL_TREE_LUMA, and the split structure of the third chroma block 1923 may be referred to as dual tree chroma DUAL_TREE_CHROMA. In addition, since only a lower-layer CU including the third luma block 1913 and the third chroma block 1923 among a plurality of lower-layer CUs generated by splitting the current CU has a dual tree structure, the split structure of the lower-layer CU may be referred to as a local dual tree structure. In this case, an example of a decoding process for the current CU is shown in FIG. 20.

Figure 20:
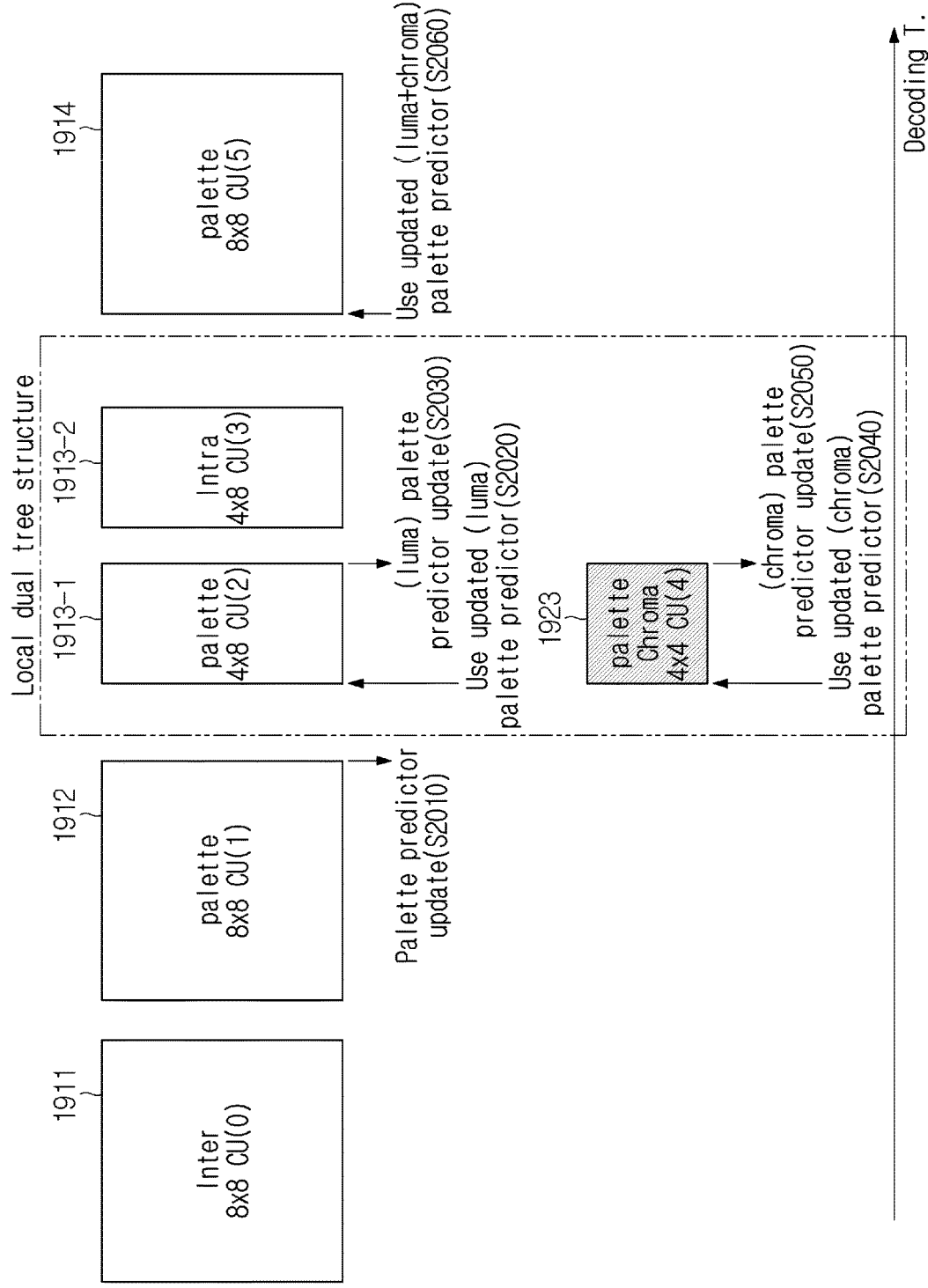
FIG. 20 is a view illustrating an example of a decoding process for CUs in the example of FIG. 19.

FIG. 20 is a view illustrating an example of a decoding process for a current CU in the example of FIG. 19.

The luma block and chroma block of a lower-layer CU having a single tree structure may be decoded based on the same prediction mode (e.g., intra prediction mode, IBC, palette mode, inter prediction mode, etc.). In contrast, the luma block and chroma block of a lower-layer CU having a dual tree structure may be individually decoded based on a combination of various prediction modes. For example, the luma block and chroma block of a lower-layer CU having the dual tree structure may be decoded using the same prediction mode or different prediction modes.

In FIG. 20, in order to distinguish between the low-layer CU having the single tree structure and the lower-layer CU having the dual tree structure, only a luma block is shown for the low-layer CU having the single tree structure, and both a luma block and a chroma block are shown for the lower-layer CU having the dual tree structure. In addition, for the low-layer CU having the single tree structure, a decoding process will be described based on the luma block.

Referring to FIG. 20, the first luma block 1911 having the single tree structure may be decoded using an inter prediction mode. In addition, the second luma block 1912 having the single tree structure may be decoded using a palette mode. In addition, the fourth luma block 1914 having the single tree structure may be decoded using a palette mode. In contrast, a (3-1)-th luma block 1913-1 having the dual tree structure may be decoded using a palette mode, a (3-2)-th luma block 1913-2 may be decoded using an intra mode, and a third chroma block 1923 may be decoded using a palette mode.

A decoding process for the first to fourth luma blocks 1911 to 1914 may be sequentially performed. In addition, the decoding process for the (3-1)-th luma block 1913-1 and the (3-2)-th luma block 1913-2 and the decoding process for the third chroma block 1923 may be performed in parallel or sequentially according to a predetermined order.

When palette decoding for the second luma block 1912 is performed, as described above, one palette predictor including a palette entry for each of a luma component and a chroma component and a palette index for identifying the palette entry may be constructed. In addition, the palette predictor may be updated using the palette entry applying for the second luma block 1912 for next palette decoding (S2010).

When palette decoding for the second luma block 1912 is competed, using the palette predictor updated in step S2010, the palette decoding for the (3-1)-th luma block 1913-1 and the third chroma block 1923 may be individually performed.

The palette predictor for the (3-1)-th luma block 1913-1 may include only a palette entry for a luma component in the palette predictor updated in step S2010 and a palette index for identifying the palette entry (S2020). The palette predictor for the (3-1)-th luma block 1913-1 may be referred to as a luma palette predictor. In addition, when the palette decoding for the (3-1)-th luma block 1913-1 is completed, the luma palette predictor may be updated using the palette entry applying for the (3-1)-th luma block 1913-1 (S2030).

The palette predictor for the third luma block 1923 may include only a palette entry for a chroma component in the palette predictor updated in step S2010 and a palette index for identifying the palette entry (S2040). The palette predictor for the third luma block 1923 may be referred to as a chroma palette predictor. In addition, when the palette decoding for the third luma block 1923 is completed, the chroma palette predictor may be updated using the palette entry applying for the third chroma block 1923 (S2050).

After performing decoding for the (3-2)-th luma block 1913-2, the palette decoding for the fourth luma block 1914 may be performed.

Figure 21:
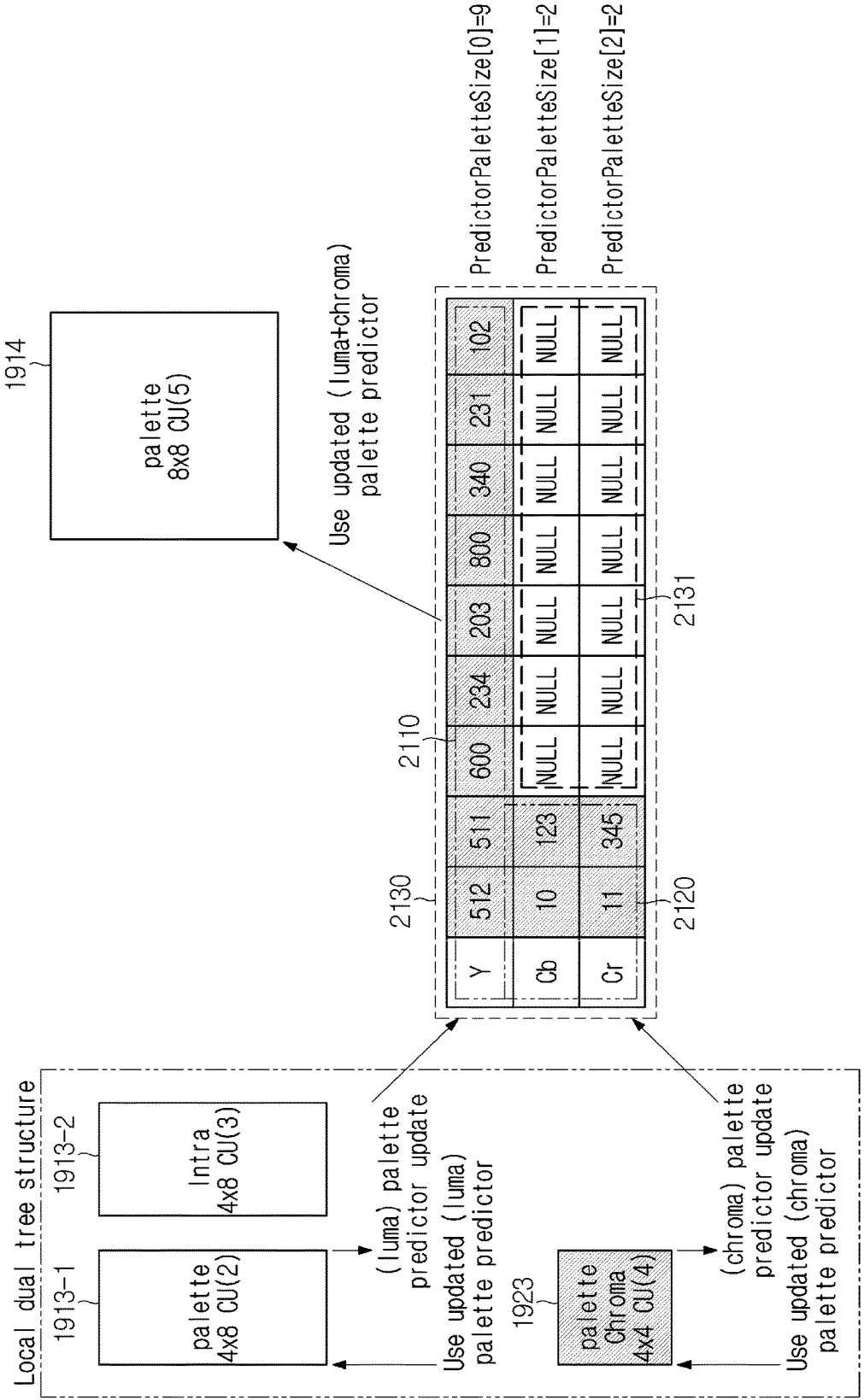
FIGS. 21 and 22 are views illustrating problems occurring when applying a palette mode in the decoding process of FIG. 20.
Figure 22:
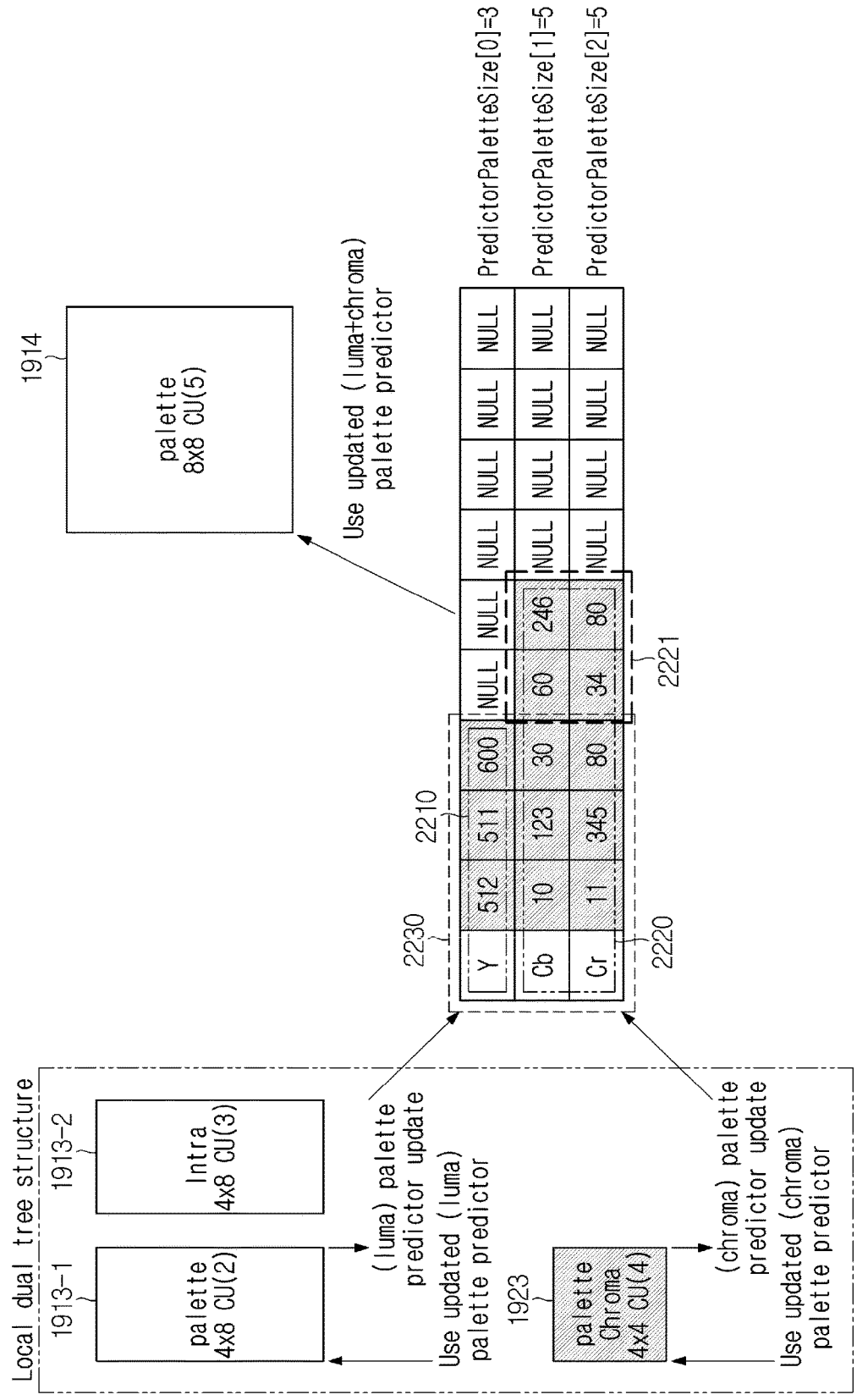

The palette predictor for the fourth luma block 1914 may be constructed by combining the luma palette predictor updated in step S2030 and the chroma palette predictor updated in step S2050 (S2060). That is, the palette predictor for the fourth luma block 1914 may include a palette entry of a luma component for the (3-1)-th luma block 1913-1, a palette entry of a chroma component for the third chroma block 1923 and a palette index for identifying each palette entry. In this case, the size (that is, the number of palette entries) of the palette predictor for the fourth luma block 1914 may be determined based on the number of palette entries of the luma component. For example, when the size of the luma palette predictor updated in step S2030 is N (N being an integer greater than 0) and the size of the chroma palette predictor updated in step S2050 is M (M being an integer greater than 0), the size of the palette predictor for the fourth luma block 1914 may be determined to be N. Due to such characteristics, the palette predictor may include an (invalid) palette entry or may not include a valid palette entry. FIGS. 21 and 22 are views illustrating problems occurring when applying a palette mode to the lower-layer CU having the local dual tree structure in the example of FIG. 20.

First, referring to FIG. 21, a luma palette predictor 2110 updated as a result of a palette decoding for the (3-1)-th luma block 1913-1 having the local dual tree structure may include, for example, 9 palette entries (representative color values), for a luma component (e.g., Y component). In addition, a chroma palette predictor 2120 updated as a result of the palette decoding for the third luma block 1923 having the dual tree structure may include, for example, two palette entries, for each chroma component (e.g., Cb component and Cr component).

In addition, after performing individual palette decoding for the (3-1)-th luma block 1913-1 and the third chroma block 1923, the palette decoding for the fourth luma block 1914 having the single tree structure may be performed. In this case, the palette predictor 2130 for the fourth luma block 1914 may be constructed by combining the luma palette predictor 2110 and the chroma palette predictor 2120 based on the size of the luma palette predictor 2110. Specifically, since the size of the luma palette predictor 2110 is 9 (e.g., PredictorPaletteSize[0]=9) and the size of the chroma palette predictor 2120 is 2 for each chroma component (e.g., Cb and Cr) (e.g., PredictorPaletteSize[1]=2, PredictorPaletteSize[2]=2), the size of the palette predictor 2130 for the fourth luma block 1914 may be determined to be 9. In order to satisfy the determined size, the palette predictor 2130 for the fourth luma block 1914 may include palette entries 2131 having 7 NULL values for each chroma component. As a result, an unnecessary memory space for storing the palette entries having the NULL value may be wasted and decoding efficiency may be deteriorated.

Next, referring to FIG. 22, a luma palette predictor 2210 updated as a result of the palette decoding for the (3-1)-th luma block 1913-1 having the local dual tree structure may include, for example, three palette entries (representative color values) for the luma component (e.g., Y). In addition, a chroma palette predictor 2220 updated as a result of the palette decoding for the third luma block 1923 having the local dual tree structure may include, for example, five palette entries for each chroma component (e.g., Cb and Cr).

In addition, after performing individual palette decoding for the (3-1)-th luma block 1913-1 and the third chroma block 1923, the palette decoding for the fourth luma block 1914 having the single tree structure may be performed. In this case, the palette predictor 2230 for the fourth luma block 1914 may be constructed by combining the luma palette predictor 2210 and the chroma palette predictor 2220 based on the size of the luma palette predictor 2210. Specifically, since the size of the luma palette predictor is 3 (e.g., PredictorPaletteSize[0]=3), and the size of the chroma palette predictor 2220 is 5 for each chroma component (e.g., Cb and Cr) (e.g. PredictorPaletteSize[1]=5, PredictorPaletteSize[2]=5), the size of the palette predictor 2230 for the fourth luma block 1914 may be determined to be 3. In order to satisfy the determined size, the last two valid palette entries 2221 for each chroma component included in the chroma palette predictor 2220 may be discarded. As a result, since an optimal palette table for the fourth luma block 1914 cannot be constructed, palette decoding performance for the palette decoding for the fourth luma block 1914 may deteriorate.

In order to solve the problems described with reference to FIGS. 21 and 22, according to the image encoding/decoding method according to embodiments of the present disclosure, a process of updating a palette predictor may be skipped or a palette mode may be selectively applied based on whether a split structure of a current block is a local dual tree structure.

Hereinafter, embodiments of the present disclosure will be described in detail with reference to the accompanying drawings.

Embodiment #1

According to Embodiment #1 of the present disclosure, in palette-encoding/decoding a current block having a local dual tree structure, a process of updating a palette predictor may be selectively performed based on a split structure of the current block.

Figure 23:
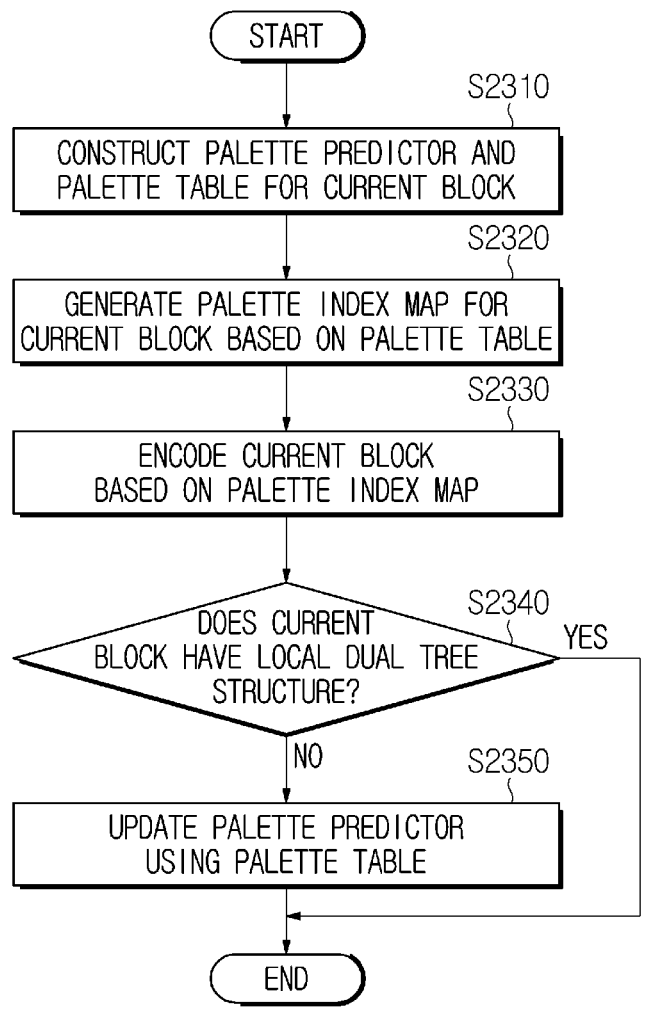
FIG. 23 is a flowchart illustrating a palette encoding method according to an embodiment of the present disclosure.

FIG. 23 is a flowchart illustrating a palette encoding method according to an embodiment of the present disclosure.

The palette encoding method of FIG. 23 may be performed by the image encoding apparatus of FIG. 2. Specifically, steps S2310 to S2350 may be performed by the intra prediction unit 165 or a separate functional block (e.g., a palette encoder) different from the intra prediction unit 165.

Whether the palette mode applies to the current block may be determined based on a prediction mode type of the current block. For example, when the prediction mode type of the current block is a first mode type (e.g., MODE_TYPE_ALL) in which all intra prediction, intra block copy (IBC), palette mode and inter prediction are applicable, the palette mode may apply for the current block. In contrast, when the prediction mode type of the current block is a second mode type (e.g., MODE_TYPE_INTRA) in which only intra prediction is applicable or a third mode type (e.g., MODE_TYPE_INTER) in which only inter prediction is applicable, the palette mode may not apply for the current block. Whether the palette mode applies to the current block may be signaled using a predetermined flag (e.g., pred_mode_plt_flag). For example, when the palette mode does not apply for the current block, pred_mode_plt_flag having a first value (e.g., 1) may be signaled. In contrast, when the palette mode applies to the current block, pred_mode_plt_flag having a second value (e.g., 1) may be signaled.

Referring to FIG. 23, when the palette mode applies to the current block, the image encoding apparatus may construct a palette predictor and a palette table for the current block (S2310).

The palette predictor may include at least one palette entry (representative color value) and a palette index for identifying the palette entry. When the current block is a block palette-encoded for the first time in a current CTU (or slice), the palette predictor may have a predetermined initial value (e.g., 0). In contrast, when the current block is not a block palette-encoded for the first time in a current CTU, the palette predictor may include at least one palette entry used in a previous palette encoding process of the current block.

The image encoding apparatus may construct a palette table based on the palette predictor. The palette table may include at least one palette entry selected from the palette predictor and a palette index for identifying each palette entry.

In an example, the palette predictor and the palette table may be variously constructed according to the color format (or chroma format) of the current block. For example, when the color format of the current block is the monochrome format described above with reference to Table 2, the palette predictor and the palette table may include only a palette entry for a luma component of the current block. In contrast, when the color format of the current block is the 4:2:0, 4:2:2 or 4:4:4 format described above with reference to Table 2, the palette predictor and the palette table may include a palette entry for each of a luma component and a chroma component of the current block.

In an example, the palette predictor and the palette table may be variously constructed according to the split structure of the current block. For example, when the current block has a single tree structure, the palette predictor and the palette table may have one configuration commonly applying for the luma component and chroma component of the current block. In contrast, when the current block has a dual tree structure, the palette predictor and the palette table may have a plurality of configurations individually applying for each of the luma component and chroma component of the current block. For example, the palette predictor for the current block may include a luma palette predictor for the luma component and a chroma palette predictor for the chroma component. In this case, the number of palette entries included in the luma palette predictor may be different from the number of palette entries included in the chroma palette predictor.

The image encoding apparatus may generate a palette index map for the current block based on the palette table (S2320).

The palette index map may mean a predetermined palette index in the palette table is mapped to each sample in the current block. For example, a palette index specifying the corresponding representative color value may be mapped to a sample having a pixel value equal or similar to a representative color value defined in the palette table among a plurality of samples in the current block. In contrast, an escape palette index may be mapped to a sample (escape sample) having a pixel value not similar to the representative color value defined in the palette table among the plurality of samples in the current block. In an example, whether a pixel value of each sample is similar to the representative color value defined in the palette table may be determined based on a predetermined threshold. For example, when a difference between a pixel value of each sample and a representative color value is equal to or less than a predetermined threshold, a palette index specifying the representative color value may be mapped to the corresponding sample. In contrast, when the difference between the pixel value of each sample and the representative color value exceeds the predetermined threshold, an escape palette index may be mapped to the corresponding sample.

The image encoding apparatus may encode the current block based on the palette index map (S2330).

The encoding process of the current block may be performed by scanning the palette indices in the palette index map according to a predetermined scan method. Specifically, the image encoding apparatus may determine an encoding mode (palette sample mode) of each of the palette indices, by scanning the palette indices mapped to the current block according to the predetermined scan method.

The scan method for palette encoding may include horizontal traverse scan and vertical traverse scan as described above with reference to FIG. 15. In an example, information on the scan method may be signaled using palette_transpose_flag. For example, when horizontal traverse scan is used for palette encoding of the current block, palette_transpose_flag having a first value (e.g., 0) may be signaled. In contrast, when vertical traverse scan is used for palette encoding of the current block, palette_transpose_flag having a second value (e.g., 1) may be signaled.

An encoding mode for encoding each of the palette indices mapped to the current block may be referred to as a palette sample mode. The palette sample mode may include an 'INDEX' mode and a 'COPY_ABOVE' mode. When the palette sample mode is determined to be the 'INDEX' mode, the value of the corresponding palette index may be encoded. In contrast, when the palette sample mode is determined to be the 'COPY_ABOVE' mode, the value of the corresponding palette index may not be encoded, and information specifying that the corresponding palette index has the same value as a palette index present above (in case of horizontal traverse scan) or to the left (in case of vertical traverse scan). In an example, information on the palette sample mode may be signaled using copy_above_palette_indices_flag. For example, when the palette sample mode for a current sample is determined to be the 'INDEX' mode, copy_above_palette_indices_flag having a first value (e.g., 0) may be signaled. In contrast, when the palette sample mode for the current sample is determined to be the 'COPY_ABOVE' mode, copy_above_palette_indices_flag having a second value (e.g., 1) may be signaled.

In addition, in the 'INDEX' mode and the 'COPY_ABOVE' mode, run-value information specifying the number of palette indices continuously encoded using the same palette sample mode may be additionally encoded.

Meanwhile, in case of an escape sample, a quantized pixel value of the escape sample may be encoded. In an example, whether the current block includes the escape sample may be signaled using an escape sample flag (e.g., palette_escape_val_present_flag). For example, when the current block does not include the escape sample, palette_escape_val_present_flag having a first value (e.g., 0) may be signaled. In contrast, when the current block includes the escape sample, palette_escape_val_present_flag having a second value (e.g., 1) may be signaled.

The image encoding apparatus may determine whether the split structure of the current block is a local dual tree structure (S2340).

In an example, whether the split structure of the current block is a local dual tree structure may be determined based on the prediction mode type of the current block. For example, as described above with reference to FIGS. 10A to 10C, when the prediction mode type of the current block is MODE_TYPE_INTRA in which only intra prediction is applicable, the split structure of the current block may be a local dual tree structure. In contrast, when the prediction mode type of the current block is not MODE_TYPE_INTRA (e.g., MODE_TYPE_ALL), the split structure of the current block may be a single tree structure.

In another example, whether the split structure of the current block is a local dual tree structure may be determined based on at least one of a tree type treeType of the current block or a split structure of a current CTU. For example, when the tree type of the current block is not a single tree SINGLE_TREE and the current CTU is included in a P or B slice or split to have a single tree structure, the split structure of the current block may be a local dual tree structure. In contrast, when the tree type of the current block is a single tree SINGLE_TREE, the split structure of the current block may be a single tree structure. Alternatively, when the current block is included in an I slice, a CTU included in the corresponding slice is implicit-quadtree-split into 64×64 luma sample CUs and the 64×64 luma sample CU is a root node of a dual tree, the split structure of the current block may be a dual tree structure. Whether the split structure of the current block is a local dual tree structure may be signaled using LocalDualTreeFlag shown in Equation 6 below.

$$LocalDualTreeFlag = (treeType\ !=\ SINGLE\_TREE\ \&\&$$
$$(sh\_slice\_type\ !=\ I\ ||\ (sh\_slice\_type\ ==\ I\ \&\&$$
$$sps\_qtbtt\_dual\_tree\_intra\_flag\ ==\ 0)))?1:0$$

[Equation 6]

Referring to Equation 6, sps_qtbtt_dual_tree_intra_flag may specify a split structure of a current CTU. For example, sps_qtbtt_dual_tree_intra_flag having a first value (e.g., 0) may specify that the current block is included in an I slice and a CTU included in the corresponding slice is split to have a single tree structure. In contrast, sps_qtbtt_dual_tree_intra_flag having a second value (e.g., 1) may specify that the current block is included in an I slice, a CTU included in the corresponding slice is implicit-quadtree-split into 64×64 luma sample CUs and the 64×64 luma sample CU is a root node of a dual tree.

The value of LocalDualTreeFlag may be determined based on a tree type treeType of the current block, a slice type sh_slice_type, and a split structure sps_qtbtt_dual_tree_intra_flag) of a current CTU. A first value (e.g., 0) of LocalDualTreeFlag may specify that the split structure of the current block is not a local dual tree structure, and a second value (e.g., 1) of LocalDualTreeFlag may specify that the split structure of the current block is a local dual tree structure.

When the split structure of the current block is not a local dual tree structure ("NO" of S2340), the image encoding apparatus may update the palette predictor using the palette table for the current block (S2350). For example, when the current block is a luma block of a monochrome format, the image encoding apparatus may update the palette predictor. In addition, when the current block is a chroma block and the split structure of the current block is not a local dual tree structure, the image encoding apparatus may update the palette predictor. In contrast, when the current block is a chroma block and the split structure of the current block is a local dual tree structure, the image encoding apparatus may not update the palette predictor.

In an example, the image encoding apparatus may update the palette predictor by adding at least one palette entry included in the palette table to the palette predictor. In addition, the image encoding apparatus may update the palette predictor by replacing at least one palette entry included in the palette predictor with at least one palette entry included in the palette table. In this case, the palette entry replaced in the palette predictor may be determined to be the oldest palette entry or least frequently used palette entry according to a first-in, first-out (FIFO) method.

In an example, the update process of the palette predictor may be continuously performed until the palette predictor reaches a maximum size. When the palette predictor does not reach the maximum size, at least one palette entry in the palette predictor which is not reused in the palette table may be added as a new palette predictor. This may be referred to as palette stuffing. In addition, information on the updated palette predictor may be encoded and signaled.

When the split structure of the current block is a local dual tree structure ("YES" of S2340), the image encoding apparatus may skip step S2350 of updating the palette predictor. In this case, for a block palette-encoded after the current block in the current CTU, a palette predictor applying for the current block may apply again.

Meanwhile, although step S2340 of determining whether the split structure of the current block is a local dual tree structure is shown as being performed after step S2330 of encoding the current block in FIG. 23, the operation order may be variously changed. For example, step S2340 may be performed before S2330 or step S2340 or may be performed simultaneously with step S2330.

Figure 24:
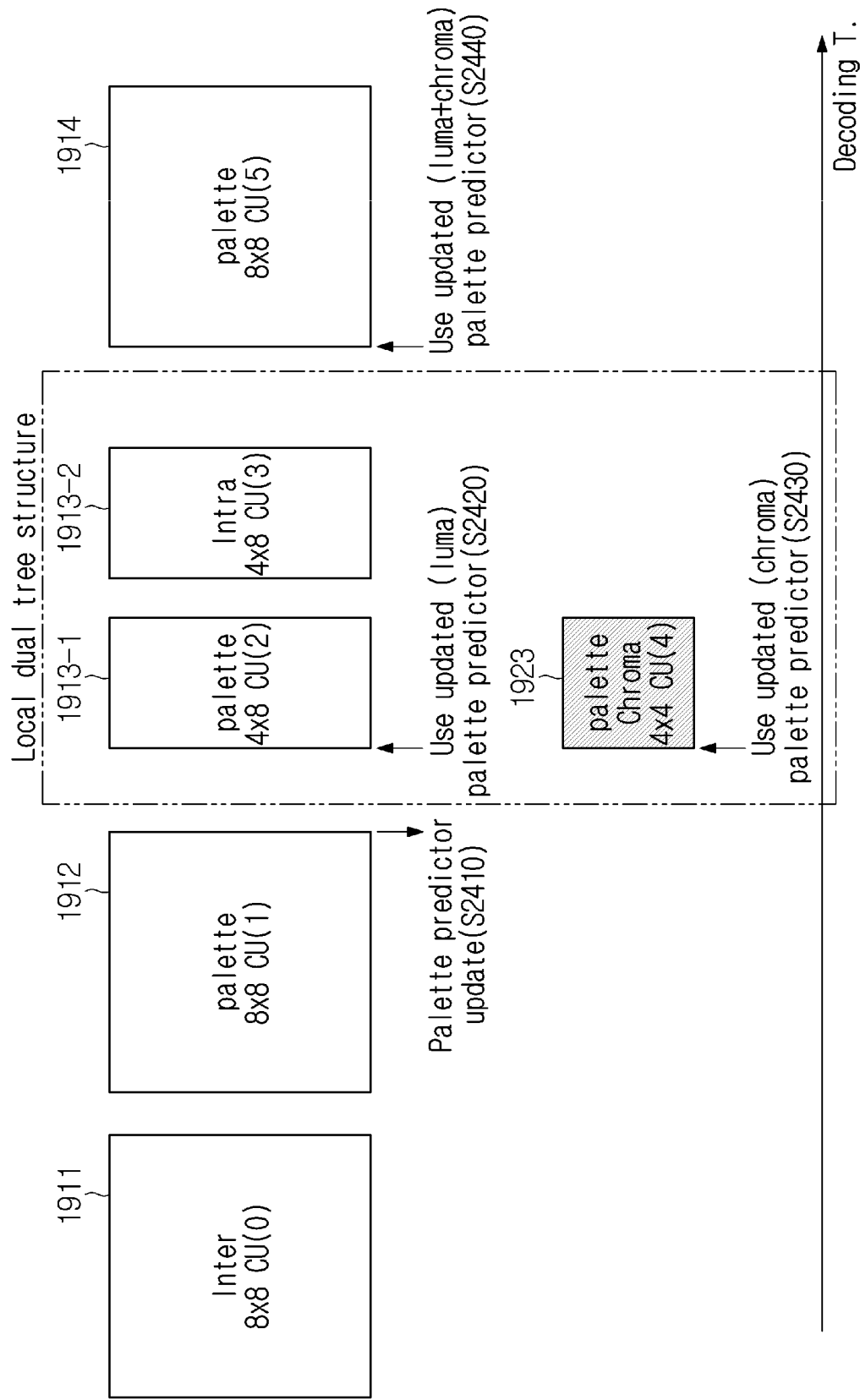
FIG. 24 is a view illustrating a palette encoding process when a palette predictor is not updated in the example of FIG. 19.
Figure 24:
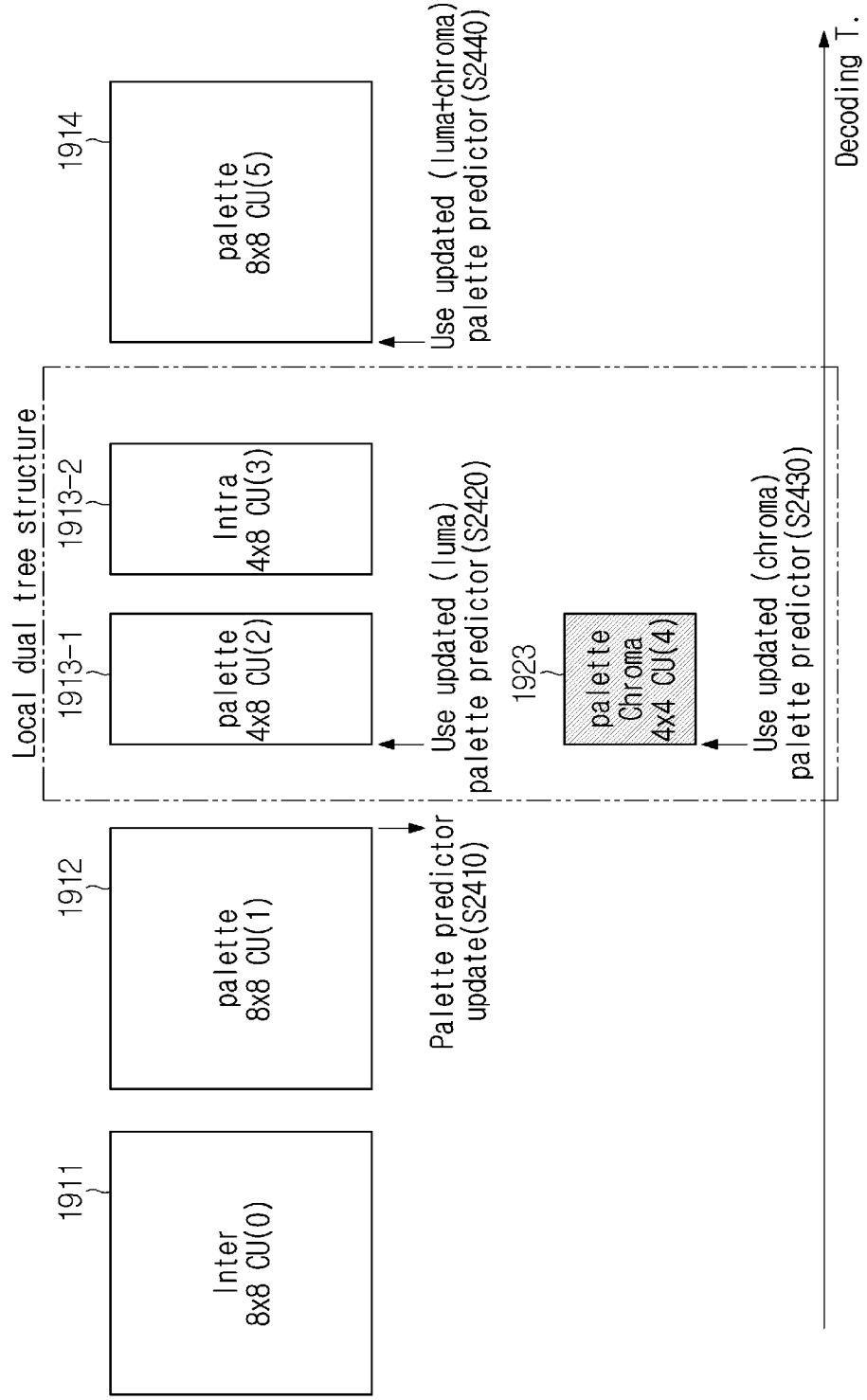

FIG. 24 is a view illustrating a palette encoding process when a palette predictor is not updated in the example of FIG. 19.

Referring to FIG. 24, in the palette predictor updated in the encoding process S2410 for the second luma block 1912, the palette entries for the luma component may be used for palette encoding of the (3-1)-th luma block 1913-1 (S2420). In addition, in the palette predictor updated in the encoding process S2410 for the second luma block 1912, the palette entries for the chroma component may be used for palette encoding of the third chroma block 1923 (S2430). In addition, in the palette encoding process for the (3-1)-th luma block 1913-1 and the third chroma block 1923 having the local dual tree structure, the process of updating the palette predictor may be skipped. As a result, for the fourth luma block 1914 palette-encoded after the (3-1)-th luma block 1913-1 and the third chroma block 1923, the palette predictor updated in the palette encoding process S2410 for the second luma block 1912 may apply again (S2440).

FIG. 25 is a view illustrating an example of a process of selectively updating a palette predictor based on a split structure of a current block.

Referring to FIG. 25, update operation for palette entries PredictorPaletteEntries constructing the palette predictor PredictorPaletteEntries[cIdx][i] may be performed only when the prediction mode type of the current block is a first mode type (e.g., MODE_TYPE_ALL) in which all intra prediction, intra block copy (IBC), palette mode and inter prediction are applicable.

A parameter CurrentPaletteSize[startComp] may specify the size (that is, the total number of palette entries) of the palette table for the current block.

The value of each of the parameters startComp, numComps and maxNumPalettePredictorSize may be differently set according to the split tree structure of the current block.

For example, when the current block has a single tree structure, the value of each of the parameters startComp, numComps and maxNumPalettePredictorSize may be set as shown in Equation 7 below.

$$startComp = 0$$
$$numComps = sps\_chroma\_format\_idc == 0\,?\,1:3$$
$$maxNumPalettePredictorSize = 63$$
[Equation 7]

Referring to Equation 7, a first color component startComp of the palette table may be set to 0. In addition, the total number numComps of color components of the palette table may be set to 1 when the color format of the current block (or the chroma format) is monochrome and may be set to 3 when the color format of the current block is a 4:4:4 format. In addition, the maximum size maxNumPalettePredictorSize of the palette predictor may be set to 63.

In contrast, when the current block has a dual tree luma structure, the value of each of the parameters startComp, numComps and maxNumPalettePredictorSize may be set as shown in Equation 8 below.

$$startComp = 0$$
$$numComps = 1$$
$$maxNumPalettePredictorSize = 31$$
[Equation 8]

Referring to Equation 8, a first color component startComp of the palette table may be set to 0. In addition, the total number numComps of color components of the palette table may be set to 1. In addition, the maximum size maxNumPalettePredictorSize of the palette predictor may be set to 31.

In addition, when the current block has a dual tree chroma structure, the value of each of the parameters startComp, numComps and maxNumPalettePredictorSize may be set as shown in Equation 9 below.

$$startComp = 1$$
$$numComps = 2$$
$$maxNumPalettePredictorSize = 31$$
[Equation 9]

Referring to Equation 9, a first color component startComp of the palette table may be set to 1. In addition, the total number numComps of color components of the palette table may be set to 2. In addition, the maximum size maxNumPalettePredictorSize of the palette predictor may be set to 31.

All palette entries of the palette table may be set to a new palette entry (newPredictorPaletteEntries [cIdx][i]=CurrentPaletteEntries[cIdx][i]). Here, cIdx may mean a color component. In addition, the size of the new palette predictor for the first color component startComp may be set to the size of the new palette predictor (newPredictorPaletteSize=CurrentPaletteSize[startComp]).

Next, based on the value of a predetermined reuse flag PalettePredictorEntryReuseFlags[i], at least one palette entry of the palette predictor may be set to the new palette entry (newPredictorPaletteEntries[cIdx][newPredictorPaletteSize]=PredictorPaletteEntries[cIdx][i]). In addition, the size of the new palette predictor may increase by 1 (newPredictorPaletteSize++).

Next, all the above-described new palette entries may be set to the palette entry of the new palette predictor (PredictorPaletteEntries[cIdx][i]=newPredictorPaletteEntries[cIdx][i]). In addition, the size of the new palette predictor may be set to the size of the palette predictor for the first color component startComp (newPredictorPaletteSize=PredictorPaletteSize[StartComp]).

Figure 26:
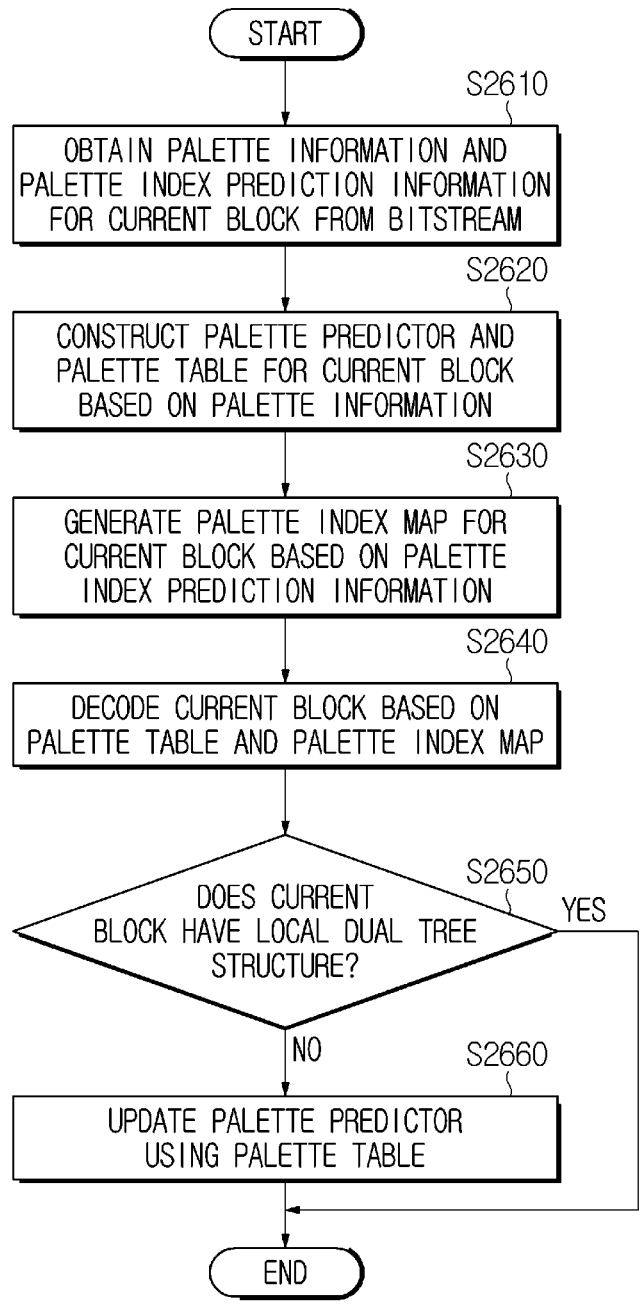
FIG. 26 is a flowchart illustrating a palette decoding method according to an embodiment of the present disclosure.

FIG. 26 is a flowchart illustrating a palette decoding method according to an embodiment of the present disclosure.

The palette decoding method of FIG. 26 may be performed by the image decoding apparatus of FIG. 3. Specifically, steps S2610 to S2660 may be performed by the intra prediction unit 265 or a separate functional block (e.g., palette decoder) different from the intra prediction unit 265.

Referring to FIG. 26, when the palette mode applies to the current block, the image decoding apparatus may obtain palette information and palette index prediction information of the current block from a bitstream (S2610).

The palette information may include information on a palette predictor. In addition, the palette information may further include information on a new palette entry. In an example, the image decoding apparatus may obtain the information on the palette predictor by decoding PredictorPaletteEntries[cIdx][i] included in the bitstream. In addition, in an example, the image decoding apparatus may obtain the information on the new palette entry, by decoding new_palette_entries[cIdx][i] included in the bitstream. In PredictorPaletteEntries[cIdx][i] and new_palette_entries[cIdx][i], cIdx may mean a color component.

The palette index prediction information may include information on a palette index map for the current block. In an example, the image decoding apparatus may obtain at least one palette index mapped to the current block, by decoding PaletteIndexMap[xC][yC] included in the bitstream. Here, xC and yC may coordinate indicators specifying relative positions of the current sample from the top-left sample of a CTU (or slice) to which the current block belongs. In an example, the image decoding apparatus may obtain run-value information of the palette index included in the palette index map, by decoding PaletteRunMinus1 included in the bitstream.

The image decoding apparatus may construct a palette predictor and palette table for the current block based on the palette information obtained from the bitstream (S2620).

In an example, the image decoding apparatus may construct the palette predictor for the current block based PredictorPaletteEntries[cIdx][i] included in the bitstream. The palette predictor may have, for example, a predetermined value (e.g., 0) initialized at a first decoding time of the CTU (or slice) including the current block. Alternatively, the palette predictor may have the same configuration as the palette predictor updated in a previous palette decoding process.

The image decoding apparatus may construct a palette table for the current block based on the palette predictor. The palette table may include at least one of the palette entry included in the palette predictor or the new palette entry obtained from the bitstream and a palette index for identifying each palette entry.

In an example, the palette predictor and the palette table may be variously constructed according to the color format of the current block (or chroma format). For example, the palette predictor and the palette table may include only a palette entry for a luma component or a palette entry for each of a luma component and a chroma component, according to the color format of the current block.

In an example, the palette predictor and the palette table may be variously constructed according to the split structure of the current block. For example, when the current block has a single tree structure, the palette predictor and the palette table may have a single configuration commonly applying for the luma component and chroma component of the current block. In contrast, when the current block has a dual tree structure, the palette predictor and the palette table may have multiple configurations separately applying for the luma component and chroma component of the current block.

The image decoding apparatus may generate a palette index map for the current block based on the palette index prediction information obtained from the bitstream (S2630). Specifically, the image decoding apparatus may generate the palette index map, by mapping the palette index to each sample in the current block according to a predetermined scan method, using the palette index obtained from the bitstream, the palette sample mode and the run-value of the palette sample mode.

The scan method for palette decoding may include horizontal traverse scan and vertical traverse scan as described above with reference to FIG. 15. In an example, the scan method for palette decoding may be determined by decoding palette_transpose_flag included in the bitstream. For example, when_transpose_flag has a first value (e.g., 0), the scan method for palette decoding may be determined to be horizontal traverse scan. In contrast, when palette_transpose_flag has a second value (e.g., 1), the scan method for palette decoding may be determined to be vertical traverse scan.

The palette sample mode may include an 'INDEX' mode and a 'COPY_ABOVE' mode, as described above. When the 'INDEX' mode applies to the current sample, the value of the palette index mapped to the current sample may be directly obtained from the bitstream. In contrast, when the 'COPY_ABOVE' mode applies to the current sample, the value of the palette index mapped to the current sample may be determined to be the value of the palette index mapped to a neighboring sample present above (in case of horizontal traverse scan) or to the left (in case of vertical traverse scan) of the current sample.

Meanwhile, when the current sample is an escape sample, a quantized pixel value of the current sample may be directly obtained from the bitstream. An escape palette index may be mapped to the escape sample.

The image decoding apparatus may decode the current block based on the palette table and the palette index map for the current block (S2640). Specifically, the image decoding apparatus may generate a prediction block for the current block, by inversely mapping the value of each palette index in the palette index map to a representative color value by referring to the palette table.

In addition, the image decoding apparatus may determine whether the current block has a local dual tree structure (S2650).

In an example, whether the split structure of the current block is a local dual tree structure may be determined based on the prediction mode type of the current block. For example, as described above with reference to FIGS. 10A to 10C, when the prediction mode type of the current block is MODE_TYPE_INTRA in which only intra prediction is applicable, the split structure of the current block may be a local dual tree structure. In contrast, when the prediction mode type of the current block is not MODE_TYPE_INTRA (e.g. MODE_TYPE_ALL), the split structure of the current block may be a single tree structure.

In another example, whether the split structure of the current block is a local dual tree structure may be determined based on at least one of a tree type treeType of the current block and a split structure of a CTU (current CTU) including the current block. For example, when the tree type of the current block is not a single tree SINGLE_TREE and the current CTU is split to have a single tree structure, the split structure of the current block may be a local dual tree structure. In contrast, when the tree type of the current block is a single tree SINGLE_TREE, the split structure of the current block may be a single tree structure. Alternatively, when the current block is included in an I slice, a CTU included in the corresponding slice is implicit-quadtree-split into 64×64 luma sample CUs and the 64×64 luma sample CU is a root node of a dual tree, the split structure of the current block may be a dual tree structure. Whether the split structure of the current block is a local dual tree structure may be determined by decoding the above-described LocalDualTreeFlag shown in Equation 6. For example, when LocalDualTreeFlag has a first value (e.g., 0), the split structure of the current block may be determined to be a single tree structure or a dual tree structure. In contrast, when LocalDualTreeFlag has a second value (e.g., 1), the split structure of the current block may be determined to be a local dual tree structure.

When the split structure of the current block is not a local dual tree structure ("NO" of S2650), the image decoding apparatus may update the palette predictor using the palette table for the current block (S2660). For example, when the current block is a luma block of a monochrome format, the image decoding apparatus may update the palette predictor. In addition, when the current block is a chroma block and the split structure of the current block is not a local dual tree structure, the image decoding apparatus may update the palette predictor. In contrast, when the current block is a chroma block and the split structure of the current block is a local dual tree structure, the image decoding apparatus may not update the palette predictor.

In an example, the image decoding apparatus may update the palette predictor by adding at least one palette entry included in the palette table to the palette predictor. In addition, the image decoding apparatus may update the palette predictor by replacing at least one palette entry included in the palette predictor with at least one palette entry included in the palette table. In this case, the palette entry replaced in the palette predictor may be determined to be the oldest palette entry or least frequently used palette entry according to a first-in, first-out (FIFO) method.

In an example, the update process of the palette predictor may be continuously performed until the palette predictor reaches a maximum size. When the palette predictor does not reach the maximum size, at least one palette entry in the palette predictor which is not reused in the palette table may be added as a new palette predictor. This may be referred to as palette stuffing.

In an example, the image decoding apparatus may update the palette predictor based on update information of the palette predictor signaled from the image encoding apparatus.

When the split structure of the current block is a local dual tree structure ("YES" of S2650), the image decoding apparatus may skip step S2660 of updating the palette predictor. In this case, for a block palette-decoded after the current block in the current CTU, a palette predictor applying for the current block may apply again.

According to Embodiment #1 of the present disclosure, when the split structure of the current block is a local dual tree structure, the process of updating the palette predictor applying for the current block may be skipped. Accordingly, the problem that the palette predictor for the block palette-encoded/decoded after the current block is not included in a valid palette entry applying for the current block or is included in an invalid palette entry may be solved.

Embodiment #2

According to Embodiment #2 of the present disclosure, in palette-encoding/decoding a current block having a local dual tree structure, the palette mode may selectively apply based on the split structure of the current block.

Figure 27:
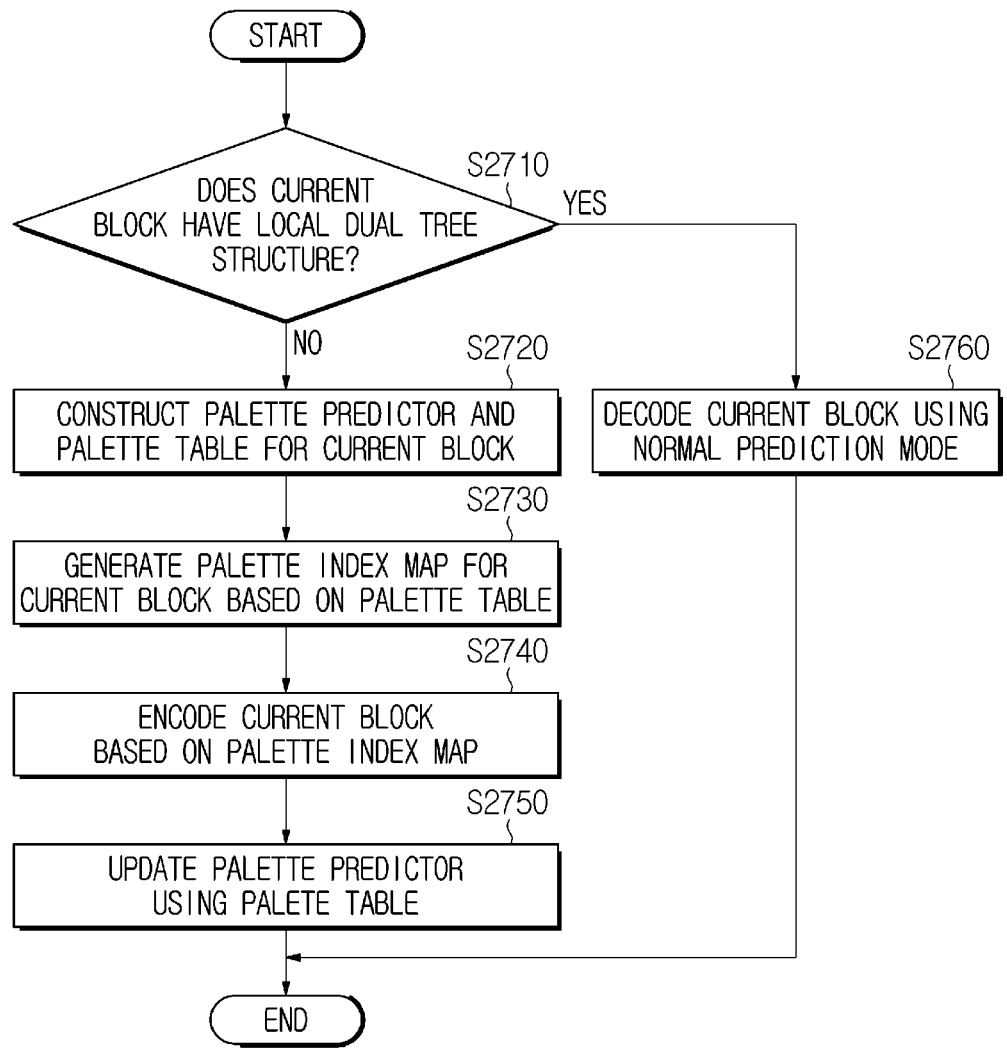
FIG. 27 is a flowchart illustrating a palette encoding method according to an embodiment of the present disclosure.

FIG. 27 is a flowchart illustrating a palette encoding method according to an embodiment of the present disclosure.

The palette encoding method of FIG. 27 may be performed by the image encoding apparatus of FIG. 2. Specifically, steps S2710 to S2760 may be performed by the intra prediction unit 165 or a separate functional block (e.g., a palette encoder) different from the intra prediction unit 165. Meanwhile, S2720 to S2750 of FIG. 27 may correspond to S2310 to S2330 and S2350 of FIG. 23. Accordingly, the description of S2720 to S2750 will be simplified.

Referring to FIG. 27, the image encoding apparatus may determine whether the split structure of the current block is a local dual tree structure (S2710).

In an example, whether the split structure of the current block is a local dual tree structure may be determined based on the prediction mode type of the current block. For example, as described above with reference to FIGS. 10A to 10C, when the prediction mode type of the current block is MODE_TYPE_INTRA in which only intra prediction is applicable, the split structure of the current block may be a local dual tree structure. In contrast, when the prediction mode type of the current block is not MODE_TYPE_INTRA (e.g., MODE_TYPE_ALL), the split structure of the current block may be a single tree structure.

In another example, whether the split structure of the current block is a local dual tree structure may be determined based on at least one of a tree type treeType of the current block or a split structure of a current CTU. For example, when the tree type of the current block is not a single tree SINGLE_TREE and the current CTU is included in a P or B slice or split to have a single tree structure, the split structure of the current block may be a local dual tree structure. In contrast, when the tree type of the current block is a single tree SINGLE_TREE, the split structure of the current block may be a single tree structure. Alternatively, when the current block is included in an I slice, a CTU included in the corresponding slice is implicit-quadtree-split into 64×64 luma sample CUs and the 64×64 luma sample CU is a root node of a dual tree, the split structure of the current block may be a dual tree structure. Whether the split structure of the current block is a local dual tree structure may be signaled using LocalDualTreeFlag shown in Equation 6 below. In this case, a first value (e.g., 0) of LocalDualTreeFlag may specify that the split structure of the current block is not a local dual tree structure, and a second value (e.g., 1) of LocalDualTreeFlag may specify that the split structure of the current block is a local dual tree structure.

When the split structure of the current block is not a local dual tree structure ("NO" of S2710), the image encoding apparatus may determine that the palette mode applies to the current block and construct a palette predictor and a palette table for the current block (S2720).

The palette predictor may include at least one palette entry (representative color value) and a palette index for identifying the palette entry. When the current block is a block palette-encoded for the first time in a current CTU (or slice), the palette predictor may have a predetermined initial value (e.g., 0). In contrast, when the current block is not a block palette-encoded for the first time in a current CTU, the palette predictor may include at least one palette entry used in a previous palette encoding process of the current block in the current CTU.

The image encoding apparatus may construct a palette table based on the palette predictor. The palette table may include at least one palette entry selected from the palette predictor and a palette index for identifying each palette entry.

In an example, the palette predictor and the palette table may be variously constructed according to the color format (or chroma format) of the current block. For example, when the color format of the current block is the monochrome format described above with reference to Table 2, the palette predictor and the palette table may include only a palette entry for a luma component of the current block. In contrast, when the color format of the current block is the 4:2:0, 4:2:2 or 4:4:4 format described above with reference to Table 2, the palette predictor and the palette table may include a palette entry for each of a luma component and a chroma component of the current block.

In an example, the palette predictor and the palette table may be variously constructed according to the split structure of the current block. For example, when the current block has a single tree structure, the palette predictor and the palette table may have one configuration commonly applying for the luma component and chroma component of the current block. In contrast, when the current block has a dual tree structure, the palette predictor and the palette table may have a plurality of configurations individually applying for each of the luma component and chroma component of the current block.

The image encoding apparatus may generate a palette index map for the current block based on the palette table (S2730). Specifically, the image encoding apparatus may generate the palette index map, by mapping the palette index to each pixel in the current block based on whether the pixel value of each pixel (sample) in the current block is equal or similar to the representative color value in the palette table.

The image encoding apparatus may encode the current block based on the palette index map (S2740).

The encoding process of the current block may be performed by scanning the palette indices in the palette index map according to a predetermined scan method. Specifically, the image encoding apparatus may determine an encoding mode (palette sample mode) of each of the palette indices, by scanning the palette indices mapped to the current block according to the predetermined scan method.

The scan method for palette encoding may include horizontal traverse scan and vertical traverse scan as described above with reference to FIG. 15. In an example, information on the scan method may be signaled using palette_transpose_flag.

The palette sample mode for encoding each of the palette indices included in the palette index map may include an 'INDEX' mode and a 'COPY_ABOVE' mode. When the palette sample mode is determined to be the 'INDEX' mode, the value of the corresponding palette index may be encoded. In contrast, when the palette sample mode is determined to be the 'COPY_ABOVE' mode, the value of the corresponding palette index may not be encoded, and information specifying that the corresponding palette index has the same value as a palette index present above (in case of horizontal traverse scan) or to the left (in case of vertical traverse scan). In an example, information on the palette sample mode may be signaled using copy_above_palette_indices_flag.

In addition, in the 'INDEX' mode and the 'COPY_ABOVE' mode, run-value information specifying the number of palette indices continuously encoded using the same palette sample mode may be additionally encoded.

Meanwhile, information specifying whether the palette index map includes an escape palette index may be signaled using an escape sample flag (e.g., palette_escape_val_present_flag). For a sample (escape sample) to which the escape palette index is mapped, a quantized pixel value of the corresponding sample may be encoded and signaled.

The image encoding apparatus may update the palette predictor using the palette table for the current block (S2750). For example, the image encoding apparatus may update the palette predictor by adding at least one palette entry included in the palette table to the palette predictor. In addition, the image encoding apparatus may update the palette predictor by replacing at least one palette entry included in the palette predictor with at least one palette entry included in the palette table. The palette entry replaced in the palette predictor may be determined to be the oldest palette entry or least frequently used palette entry according to a first-in, first-out (FIFO) method.

The update process of the palette predictor may be continuously performed until the palette predictor reaches a maximum size. For example, the palette predictor may be updated through palette stuffing until reaching the maximum palette size.

When the split structure of the current block is a local dual tree structure ("YES" of S2710), the image encoding apparatus may not apply the palette mode to the current block and may encode the current block using a normal prediction mode (e.g., intra prediction mode, inter prediction mode, etc.) other than the palette mode (S2760). Details of the normal prediction mode have been described above with reference to FIGS. 1 to 14.

Meanwhile, information on whether the palette mode applies to the current block may be signaled using a palette mode flag (e.g., pred_mode_plt_flag).

FIG. 28 is a view illustrating a detailed example of coding_unit syntax including a palette mode flag.

Referring to FIG. 28, pred_mode_plt_flag may specify whether the palette mode applies to the current block (or current CU). For example, pred_mode_plt_flag having a first value (e.g., 0) may specify that the palette mode may not apply for the current block. In contrast, pred_mode_plt_flag having a second value (e.g., 1) may specify that the palette mode may apply for the current block.

In an example, pred_mode_plt_flag may be signaled based on the prediction mode type of the current block. For example, when the prediction mode type of the current block is a first mode type (e.g., MODE_TYPE_ALL) in which all intra prediction, intra block copy (IBC), palette mode and inter prediction are applicable, pred_mode_plt_flag may be signaled. In contrast, when the prediction mode type of the current block is a second mode type (e.g., MODE_TYPE_INTRA) in which only intra prediction is applicable or a third mode type (e.g., MODE_TYPE_INTER) in which only inter prediction is applicable, pred_mode_plt_flag may not be signaled FIG. 29 is a flowchart illustrating a palette decoding method according to an embodiment of the present disclosure.

Figure 29:
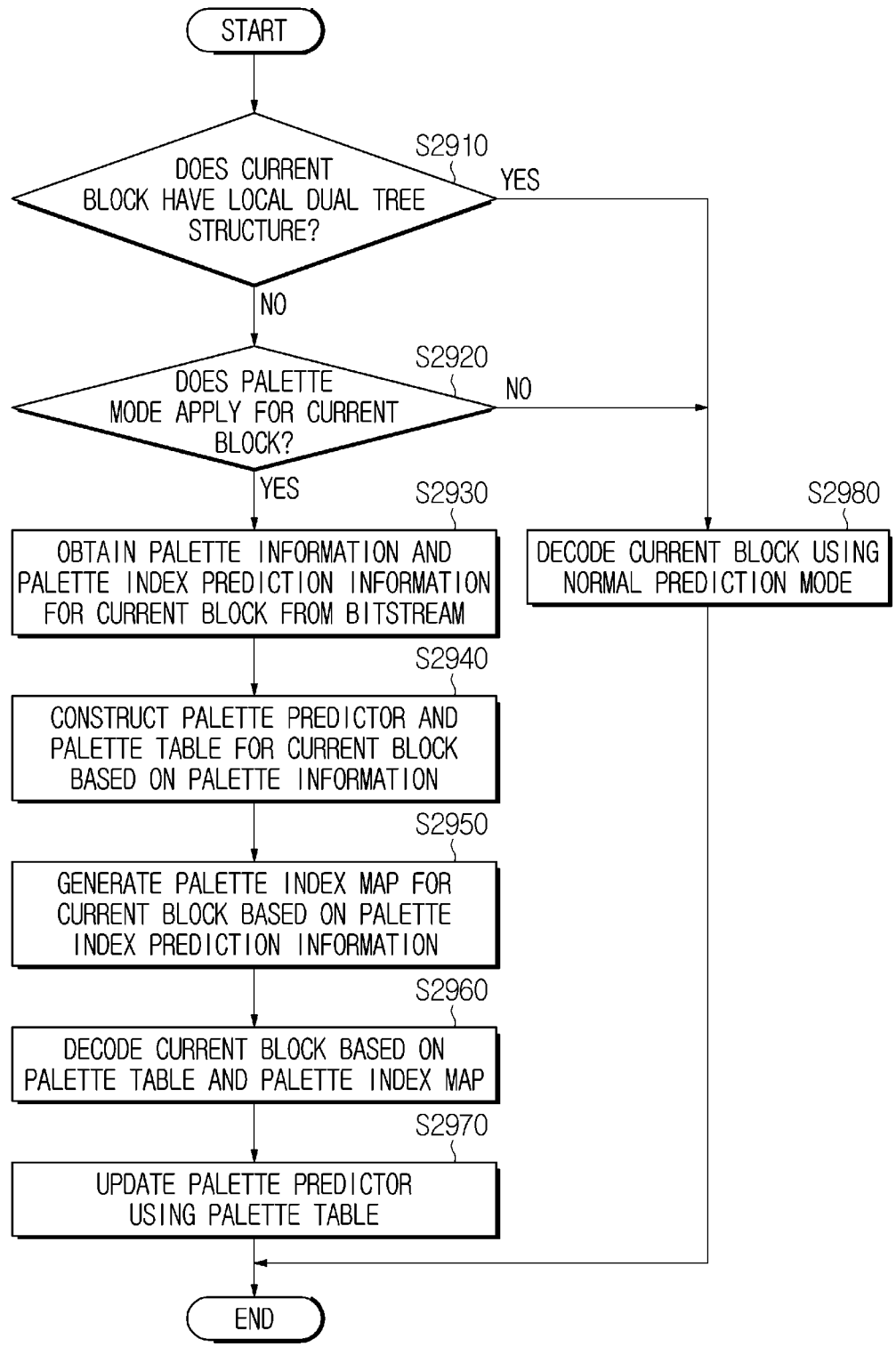
FIG. 29 is a flowchart illustrating a palette decoding method according to an embodiment of the present disclosure.

The palette decoding method of FIG. 29 may be performed by the image decoding apparatus of FIG. 3. Specifically, steps S2910 to S2980 may be performed by the intra prediction unit 265 or a separate functional block (e.g., palette decoder) different from the intra prediction unit 265. Meanwhile, S52930 to S2970 of FIG. 29 may correspond to S2610 to S2640 and S2660 of FIG. 26. Accordingly, the description of S2930 to S2970 may be simplified.

Referring to FIG. 29, the image decoding apparatus may determine whether the split structure of the current block is a local dual tree structure (S2910).

In an example, whether the split structure of the current block is a local dual tree structure may be determined based on the prediction mode type of the current block. For example, as described above with reference to FIGS. 10A to 10C, when the prediction mode type of the current block is MODE_TYPE_INTRA in which only intra prediction is applicable, the split structure of the current block may be a local dual tree structure. In contrast, when the prediction mode type of the current block is not MODE_TYPE_INTRA (e.g., MODE_TYPE_ALL), the split structure of the current block may be a single tree structure.

In another example, whether the split structure of the current block is a local dual tree structure may be determined based on at least one of a tree type treeType of the current block or a split structure of a current CTU. For example, when the tree type of the current block is not a single tree SINGLE_TREE and the current CTU is included in a P or B slice or split to have a single tree structure, the split structure of the current block may be a local dual tree structure. In contrast, when the tree type of the current block is a single tree SINGLE_TREE, the split structure of the current block may be a single tree structure. Alternatively, when the current block is included in an I slice, a CTU included in the corresponding slice is implicit-quadtree-split into 64×64 luma sample CUs and the 64×64 luma sample CU is a root node of a dual tree, the split structure of the current block may be a dual tree structure. Whether the split structure of the current block is a local dual tree structure may be signaled by decoding the above-described LocalDualTreeFlag shown in Equation 6. For example, a first value (e.g., 0) of LocalDualTreeFlag has may specify that the split structure of the current block is not a local dual tree structure and a second value (e.g., 1) of LocalDualTreeFlag may specify that the split structure of the current block is a local dual tree structure.

When the split structure of the current block is not a local dual tree structure ("NO" of S2910), the image decoding apparatus may determine whether the palette mode applies to the current block. In an example, the image decoding apparatus may determine whether the palette mode applies to the current block based on a palette mode flag (e.g., pred_mode_plt_flag) obtained from the bitstream. For example, when pred_mode_plt_flag described above with reference to FIG. 28 has a first value (e.g., 0), the palette mode may apply for the current block. In contrast, when pred_mode_plt_flag has a second value (e.g., 1), the palette mode may apply for the current block. Meanwhile, when pred_mode_plt_flag is not obtained from the bitstream, the value of pred_mode_plt_flag may be inferred as having a first value.

When the palette mode applies to the current block ("YES" of S2920), the image decoding apparatus may obtain palette information and palette index prediction information of the current block from the bitstream (S2930). The palette information may include information on a palette predictor and/or a new palette entry. The palette index prediction information may have a palette index mapped to the current block and run-value information of the palette index.

The image decoding apparatus may construct a palette predictor and a palette table for the current block based on the palette information obtained from the bitstream (S2940). In an example, the palette predictor may have the same configuration as the palette predictor updated in the previous palette decoding process of the current block. Meanwhile, when the information on the palette predictor is not obtained from the bitstream, the palette predictor may have a predetermined initial value (e.g., 0) or the same configuration as the palette predictor used in the previous palette decoding process.

The image decoding apparatus may construct a palette table for the current block based on palette predictor. The palette table may include at least one of the palette entry included in the palette predictor or the new palette entry obtained from the bitstream and a palette index for identifying each palette entry.

In an example, the palette predictor and the palette table may be variously constructed according to the color format of the current block (or chroma format). In addition, the palette predictor and the palette table may be variously constructed according to the split structure of the current block.

The image decoding apparatus may generate a palette index map for the current block based on the palette index prediction information (S2950). Specifically, the image decoding apparatus may generate the palette index map, by mapping the palette index to each sample in the current block according to a predetermined scan method, using the palette index obtained from the bitstream, the palette sample mode and the run-value of the palette sample mode.

The scan method for palette decoding may include horizontal traverse scan and vertical traverse scan as described above with reference to FIG. 15. In an example, the scan method for palette decoding may be determined by decoding palette_transpose_flag included in the bitstream. For example, when_transpose_flag has a first value (e.g., 0), the scan method for palette decoding may be determined to be horizontal traverse scan. In contrast, when palette_transpose_flag has a second value (e.g., 1), the scan method for palette decoding may be determined to be vertical traverse scan.

The palette sample mode may include an 'INDEX' mode and a 'COPY_ABOVE' mode, as described above. When the 'INDEX' mode applies to the current sample, the value of the palette index mapped to the current sample may be directly obtained from the bitstream. In contrast, when the 'COPY_ABOVE' mode applies to the current sample, the value of the palette index mapped to the current sample may be determined to be the value of the palette index mapped to a neighboring sample present above (in case of horizontal traverse scan) or to the left (in case of vertical traverse scan) of the current sample.

Meanwhile, when the current sample is an escape sample, a quantized pixel value of the current sample may be directly obtained from the bitstream. An escape palette index may be mapped to the escape sample.

The image decoding apparatus may decode the current block based on the palette table and the palette index map for the current block (S2960). Specifically, the image decoding apparatus may generate a prediction block for the current block by inversely mapping the value of each palette index in the palette index map to a representative color value by referring to the palette table.

The image decoding apparatus may update the palette predictor using the palette table for the current block (S2970). For example, the image decoding apparatus may update the palette predictor by adding at least one palette entry included in the palette table to the palette predictor. In addition, the image decoding apparatus may update the palette predictor by replacing at least one palette entry included in the palette predictor with at least one palette entry included in the palette table.

In an example, the update process of the palette predictor may be continuously performed until the palette predictor reaches a maximum palette size. For example, the palette predictor may be updated through palette stuffing until reaching the maximum palette size.

In an example, the image decoding apparatus may update the palette predictor based on update information of the palette predictor signaled from the image encoding apparatus.

When the split structure of the current block is a local dual tree structure ("YES" of S2910), the image decoding apparatus may not apply the palette mode to the current block and may decode the current block using a normal prediction mode (e.g., intra prediction mode, inter prediction mode, etc.) other than the palette mode (S2980). Details of the normal prediction mode have been described above with reference to FIGS. 1 to 14. In this case, for the block palette-decoded after the current block in the current CTU, a palette predictor initialized to a predetermined value (e.g., 0) may apply or the palette predictor applying for the current block may apply again.

According to Embodiment #2 of the present disclosure, when the split structure of the current block is a local dual tree structure, the current block may be encoded/decoded using a normal prediction mode other than the palette mode. Accordingly, since the process of updating the palette predictor is skipped, the problem that the palette predictor is not included in a valid palette entry or is included in an invalid palette entry may be solved.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 30:
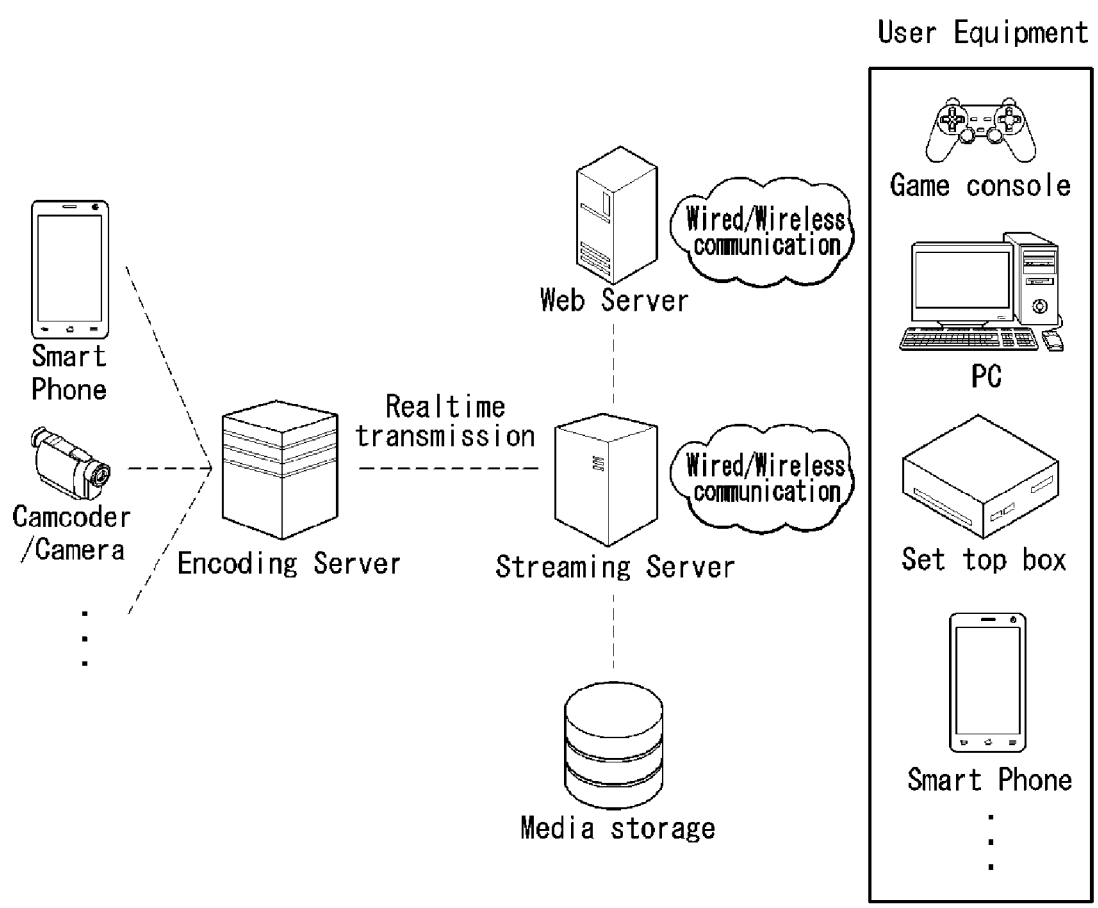
FIG. 30 is a view showing a content streaming system, to which an embodiment of the present disclosure is applicable.

FIG. 30 is a view showing a contents streaming system, to which an embodiment of the present disclosure is applicable.

As shown in FIG. 30, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
obtaining palette information and palette index prediction information of a current block from a bitstream, based on a palette mode applying for the current block;
constructing a palette predictor for the current block based on the palette information and constructing a palette table for the current block based on the palette predictor;
generating a palette index map for the current block based on the palette index prediction information; and
decoding the current block based on the palette table and the palette index map,
wherein whether the palette mode applies for the current block is determined based on a split structure of the current block being a local dual tree structure,
wherein whether the split structure of the current block is the local dual tree structure is determined based on at least one of a tree type of the current block and a split structure of a coding tree unit (CTU) including the current block,
wherein the local dual tree structure is a split structure in which additional splitting is performed only for a luma block within a CTU that has been split into a single tree structure.

2. The image decoding method of claim 1, wherein, based on the current block being a chroma block and the split structure of the current block being the local dual tree structure, the palette predictor is not updated.

3. The image decoding method of claim 1, wherein, based on the current block being a chroma block and the split structure of the current block being not the local dual tree structure, the palette predictor is updated based on the palette table.

4. The image decoding method of claim 3, wherein the updated palette predictor comprises at least one palette entry included in the palette table.

5. The image decoding method of claim 3, wherein the updated palette predictor comprises at least one new palette entry not included in the palette table within a predetermined maximum size range.

6. The image decoding method of claim 1, wherein, based on the split structure of the current block being the local dual tree structure and a treeType of the current block being a dual tree chroma, it is determined that the palette mode does not apply for the current block.

7. The image decoding method of claim 1, wherein whether the split structure of the current block is the local dual tree structure is determined based on a prediction mode type of the current block and a tree type of the current block.

8. The image decoding method of claim 7, wherein the split structure of the current block is determined to be the local dual tree structure based on the tree type of the current block being dual tree chroma and the prediction mode type of the current block being a mode type for which intra prediction, intra block copy (IBC) and palette mode are all applicable.

9. An image encoding method performed by an image encoding apparatus, the image encoding method comprising:
   based on a palette mode applying for a current block, constructing a palette predictor for the current block and constructing a palette table for the current block based on the palette predictor;
   generating a palette index map for the current block based on the palette table; and
   encoding the current block based on the palette index map,
   wherein whether the palette mode applies for the current block is determined based on a split structure of the current block being a local dual tree structure,
   wherein whether the split structure of the current block is the local dual tree structure is determined based on at least one of a tree type of the current block and a split structure of a coding tree unit (CTU) including the current block,
   wherein the local dual tree structure is a split structure in which additional splitting is performed only for a luma block within a CTU that has been split into a single tree structure.

10. The image encoding method of claim 9, wherein, based on the current block being a chroma block and the split structure of the current block being the local dual tree structure, the palette predictor is not updated.

11. The image encoding method of claim 9, wherein, based on the current block being a chroma block and the split structure of the current block being not the local dual tree structure, the palette predictor is updated based on the palette table.

12. The image encoding method of claim 9, wherein, based on the split structure of the current block being the local dual tree structure and a treeType of the current block being a dual tree chroma, it is determined that the palette mode does not apply for the current block.

13. A method for transmitting a bitstream generated by an image encoding method, the image encoding method comprising:
   based on a palette mode applying for a current block, constructing a palette predictor for the current block and constructing a palette table for the current block based on the palette predictor;
   generating a palette index map for the current block based on the palette table; and
   encoding the current block based on the palette index map,
   wherein whether the palette mode applies for the current block is determined based on a split structure of the current block being a local dual tree structure,
   wherein whether the split structure of the current block is the local dual tree structure is determined based on at least one of a tree type of the current block and a split structure of a coding tree unit (CTU) including the current block,
   wherein the local dual tree structure is a split structure in which additional splitting is performed only for a luma block within a CTU that has been split into a single tree structure.

* * * * *